(12) United States Patent
Ura et al.

(10) Patent No.: US 11,334,813 B2
(45) Date of Patent: May 17, 2022

(54) METHOD AND APPARATUS FOR MANAGING MACHINE LEARNING PROCESS

(71) Applicant: FUJITSU LIMITED, Kawasaki (JP)

(72) Inventors: Akira Ura, Yokohama (JP); Kenichi Kobayashi, Kawasaki (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 1401 days.

(21) Appl. No.: 15/597,976

(22) Filed: May 17, 2017

(65) Prior Publication Data
US 2017/0372229 A1    Dec. 28, 2017

(30) Foreign Application Priority Data
Jun. 22, 2016   (JP) .............................. JP2016-123405

(51) Int. Cl.
*G06N 20/00*   (2019.01)

(52) U.S. Cl.
CPC .................. *G06N 20/00* (2019.01)

(58) Field of Classification Search
CPC ....... G06N 3/00–126; G06N 5/00–048; G06N 7/00–026; G06N 20/00–20
USPC ..................................................... 706/10–62
See application file for complete search history.

(56) References Cited

U.S. PATENT DOCUMENTS

| 8,756,175 B1 * | 6/2014 | Szegedy ............... G06N 20/00 706/12 |
| 2009/0228412 A1 | 9/2009 | Matsumoto et al. |
| 2014/0344193 A1 * | 11/2014 | Bilenko ............... G06N 20/00 706/12 |
| 2016/0132787 A1 * | 5/2016 | Drevo ................... G06N 20/10 706/12 |

FOREIGN PATENT DOCUMENTS

| JP | 2009-217348 | 9/2009 |
| JP | 2010-092266 | 4/2010 |
| JP | 2015-060237 | 3/2015 |

OTHER PUBLICATIONS

Gang Luo, "MLBCD: a machine learning tool for big clinical data", 2015, Health Information Science and Systems.*

(Continued)

*Primary Examiner* — Jue Louie
(74) *Attorney, Agent, or Firm* — Fujitsu Patent Center

(57) ABSTRACT

A processor obtains a first measurement value representing prediction performance of a model that has been learned by using a first parameter value and training data of first size. The processor calculates a first expected value and a first variance degree of prediction performance of a model that would be learned by using the first parameter value and training data of second size. The processor also obtains a second measurement value representing prediction performance of a model that has been learned by using a second parameter value and training data of the first size. The processor calculates a second expected value and a second variance degree of prediction performance of a model that would be learned by using the second parameter value and training data of the second size.

7 Claims, 25 Drawing Sheets

(56) References Cited

OTHER PUBLICATIONS

Foster Provost et al., "Efficient Progressive Sampling", Proceedings of the 5th International Conference on Knowledge Discovery and Data Mining, pp. 23-32, Association for Computing Machinery (ACM), Aug. 1999 (10 pages).

Jasper Snoek et al., "Practical Bayesian Optimization of Machine Learning Algorithms", Advances in Neural Information Processing Systems 25 (NIPS 2012), pp. 2951-2959, Dec. 2012 (10 pages).

Frank Hutter et al., "Sequential Model-Based Optimization for General Algorithm Configuration", Proceedings of the 5th International Conference on Learning and Intelligent Optimization (LION 5), vol. 6683 of the series Lecture Notes in Computer Science, pp. 507-523, Springer, Jan. 2011 (17 pages).

James Bergstra et al., "Algorithms for Hyper-Parameter Optimization", Advances in Neural Information Processing Systems 24 (NIPS 2011), Dec. 2011 (10 pages).

Matthias Feurer et al., "Initializing Bayesian Hyperparameter Optimization via Meta-Learning", the Twenty-Ninth AAAI Conference on Artificial Intelligence (AAAI'15), pp. 1128-1135, Jan. 2015 (9 pages).

Remi Bardenet et al., "Collaborative Hyperparameter Tuning", Proceedings of the 30th International Conference on Machine Learning (ICML'13), Jun. 2013 (9 pages).

Dani Yogatama et al., "Efficient Transfer Learning Method for Automatic Hyperparameter Tuning", Proceedings of the 17th International Conference on Articial Intelligence and Statistics (AISTATS 2014), Apr. 2014 (9 pages).

Kevin Swersky et al., "Multi-Task Bayesian Optimization", Advances in Neural Information Processing Systems 26 (NIPS 2013), Dec. 2013 (10 pages).

Paul W. Goldberg et al., "Regression with Input-dependent Noise: A Gaussian Process Treatment", Advances in Neural Information Processing 10 (NIPS 1997), Dec. 1997 (8 pages).

\* cited by examiner

FIG. 4
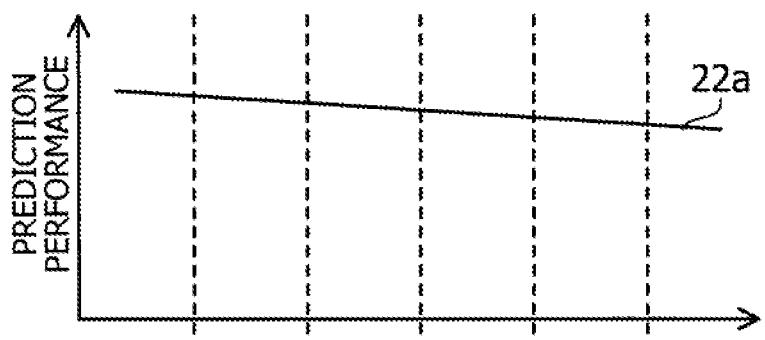
(A) s=200
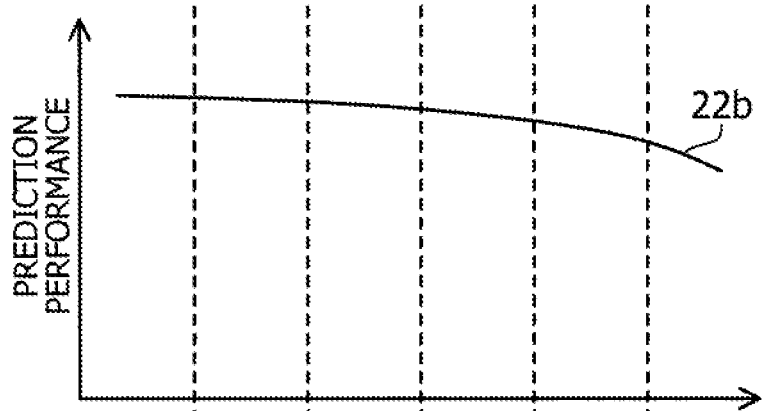
(B) s=800
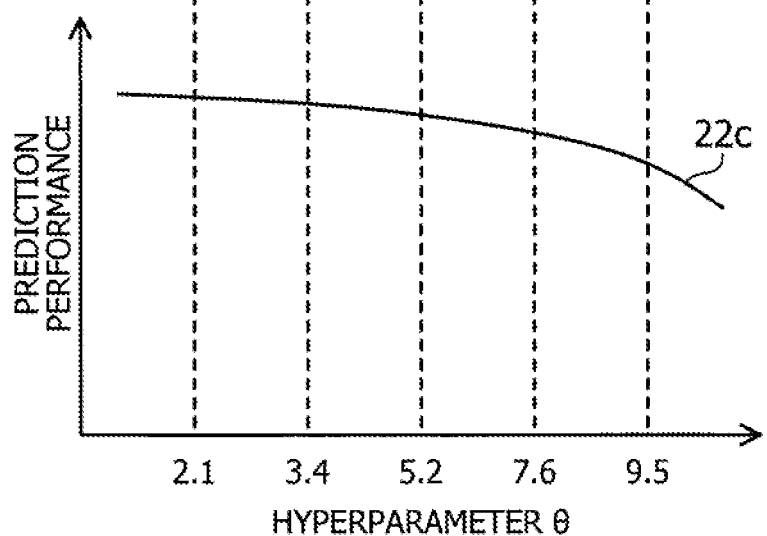
(C) s=3200

FIG. 7

| [EXECUTION ORDER] | | SAMPLE SIZE | | | | |
|---|---|---|---|---|---|---|
| | | ≤ 800 | 1600 | 3200 | 6400 | 12800 |
| HYPER-PARAMETER | 2.1 | 1 | 6 | 8 | | |
| | 3.4 | 4 | 9 | | | |
| | 5.2 | 3 | 7 | | | |
| | 7.6 | 5 | | | | |
| | 9.5 | 2 | | | | |

FIG. 8

|     | 100  | 200  | 400  | 800  | 1600 | 3200 | 6400 |
|-----|------|------|------|------|------|------|------|
| 2.1 | 0.71 | 0.80 | 0.85 | 0.89 | 0.92 | 0.93 | 0.94 ±0.02 |
| 3.4 | 0.70 ±0.03 | 0.77 ±0.03 | 0.82 ±0.03 | 0.85 ±0.03 | 0.88 ±0.03 | 0.89 ±0.03 | 0.90 ±0.03 |
| 9.5 | 0.68 | 0.70 | 0.72 | 0.72 | 0.72 ±0.01 | 0.72 ±0.01 | 0.72 ±0.01 |

FIG. 10

| | 100 | 200 | 400 | 800 | 1600 | 3200 | 6400 |
|---|---|---|---|---|---|---|---|
| 2.1 | 0.71 | 0.80 | 0.85 | 0.89 | 0.92 | 0.93 | 0.94 ±0.02 |
| 3.4 | 0.70 ±0.03 | 0.77 ±0.03 | 0.82 ±0.03 | 0.85 ±0.03 | | | |
| 9.5 | 0.68 | 0.70 | 0.72 | 0.72 | 0.72 ±0.01 | 0.72 ±0.01 | 0.72 ±0.01 |

⇩ MONTE CARLO SIMULATION

| | 1600 | 3200 | 6400 |
|---|---|---|---|
| 2.1 | 0.92 | 0.93 | 0.93 |
| 3.4 | 0.885 ±0.03 | 0.89 ±0.03 | 0.89 ±0.03 |
| 9.5 | 0.73 | 0.72 | 0.71 |

| | 1600 | 3200 | 6400 |
|---|---|---|---|
| 2.1 | 0.92 | 0.93 | 0.96 |
| 3.4 | 0.88 ±0.03 | 0.89 ±0.03 | 0.91 ±0.03 |
| 9.5 | 0.72 | 0.72 | 0.73 |

...

⇩ CONSOLIDATE

| | 100 | 200 | 400 | 800 | 1600 | 3200 | 6400 |
|---|---|---|---|---|---|---|---|
| 2.1 | 0.71 | 0.80 | 0.85 | 0.89 | 0.92 | 0.93 | 0.94 ±0.02 |
| 3.4 | 0.70 ±0.03 | 0.77 ±0.03 | 0.82 ±0.03 | 0.85 ±0.03 | 0.88 ±0.032 | 0.892 ±0.031 | 0.903 ±0.04 |
| 9.5 | 0.68 | 0.70 | 0.72 | 0.72 | 0.72 ±0.01 | 0.72 ±0.01 | 0.72 ±0.01 |

FIG. 12

LEARNING RESULT TABLE 131

| HYPER-PARAMETER | PREDICTION PERFORMANCE (UPPER) EXECUTION TIME (LOWER) | | | | | | |
|---|---|---|---|---|---|---|---|
| | 100 | 200 | 400 | 800 | 1600 | 3200 | 6400 |
| 2.1 | $\mu_{1,1}$=0.71 | $\mu_{1,2}$=0.80 | $\mu_{1,3}$=0.85 | $\mu_{1,4}$=0.89 | $\mu_{1,5}$=0.92 | $\mu_{1,6}$=0.93 | — |
| | $u_{1,1}$ | $u_{1,2}$ | $u_{1,3}$ | $u_{1,4}$ | $u_{1,5}$ | $u_{1,6}$ | — |
| 3.4 | — | — | — | — | — | — | — |
| | — | — | — | — | — | — | — |
| ⋮ | ⋮ | ⋮ | ⋮ | ⋮ | ⋮ | ⋮ | ⋮ |
| 9.5 | $\mu_{5,1}$=0.68 | $\mu_{5,2}$=0.70 | $\mu_{5,3}$=0.72 | $\mu_{5,4}$=0.72 | — | — | — |
| | $u_{5,1}$ | $u_{5,2}$ | $u_{5,3}$ | $u_{5,4}$ | — | — | — |
| ⋮ | ⋮ | ⋮ | ⋮ | ⋮ | ⋮ | ⋮ | ⋮ |

FIG. 13

INTERMEDIATE ESTIMATION TABLE 132

| HYPER-PARAMETER | PREDICTION PERFORMANCE (UPPER) EXECUTION TIME (LOWER) | | | | | | |
|---|---|---|---|---|---|---|---|
| | 100 | 200 | 400 | 800 | 1600 | 3200 | 6400 |
| 2.1 | — | — | — | — | — | — | $\mu_{1,7} \pm \sigma_{1,7}$ |
| | — | — | — | — | — | — | $u_{1,7}$ |
| 3.4 | $\mu_{2,1} \pm \sigma_{2,1}$ | $\mu_{2,2} \pm \sigma_{2,2}$ | $\mu_{2,3} \pm \sigma_{2,3}$ | $\mu_{2,4} \pm \sigma_{2,4}$ | $\mu_{2,5} \pm \sigma_{2,5}$ | $\mu_{2,6} \pm \sigma_{2,6}$ | $\mu_{2,7} \pm \sigma_{2,7}$ |
| | $u_{2,1}$ | $u_{2,2}$ | $u_{2,3}$ | $u_{2,4}$ | $u_{2,5}$ | $u_{2,6}$ | $u_{2,7}$ |
| ⋮ | ⋮ | ⋮ | ⋮ | ⋮ | ⋮ | ⋮ | ⋮ |
| 9.5 | — | — | — | — | $\mu_{5,5} \pm \sigma_{5,5}$ | $\mu_{5,6} \pm \sigma_{5,6}$ | $\mu_{5,7} \pm \sigma_{5,7}$ |
| | — | — | — | — | $u_{5,5}$ | $u_{5,6}$ | $u_{5,7}$ |
| ⋮ | ⋮ | ⋮ | ⋮ | ⋮ | ⋮ | ⋮ | ⋮ |

FIG. 14

ESTIMATION TABLE

| HYPER-PARAMETER | PERFORMANCE IMPROVEMENT (UPPER) AND CUMULATIVE EXECUTION TIME (LOWER) | | | | | | | IMPROVE-MENT SPEED |
|---|---|---|---|---|---|---|---|---|
| | 100 | 200 | 400 | 800 | 1600 | 3200 | 6400 | |
| 2.1 | — | — | — | — | — | — | $g_{1,7}$ | $v_1$ |
| | — | — | — | — | — | — | $t_{1,7}$ | |
| 3.4 | $g_{2,1}$ | $g_{2,2}$ | $g_{2,3}$ | $g_{2,4}$ | $g_{2,5}$ | $g_{2,6}$ | $g_{2,7}$ | $v_2$ |
| | $t_{2,1}$ | $t_{2,2}$ | $t_{2,3}$ | $t_{2,4}$ | $t_{2,5}$ | $t_{2,6}$ | $t_{2,7}$ | |
| ⋮ | ⋮ | ⋮ | ⋮ | ⋮ | ⋮ | ⋮ | ⋮ | ⋮ |
| 9.5 | — | — | — | — | $g_{5,5}$ | $g_{5,6}$ | $g_{5,7}$ | $v_3$ |
| | — | — | — | — | $t_{5,5}$ | $t_{5,6}$ | $t_{5,7}$ | |
| ⋮ | ⋮ | ⋮ | ⋮ | ⋮ | ⋮ | ⋮ | ⋮ | ⋮ |

133

FIG. 17 ESTIMATE EXECUTION TIME

FIG. 19 ESTIMATE PERFORMANCE IMPROVEMENT

FIG. 22

| [EXECUTION ORDER] | | SAMPLE SIZE | | | | |
|---|---|---|---|---|---|---|
| | | ≤ 800 | 1600 | 3200 | 6400 | 12800 |
| HYPER-PARAMETER | 2.1 | 1 | 2 | 3 | 4 | 5 |
| | 3.4 | | | | | |
| | 5.2 | 7 | 8 | 9 | | |
| | 7.6 | | | | | |
| | 9.5 | 6 | | | | |

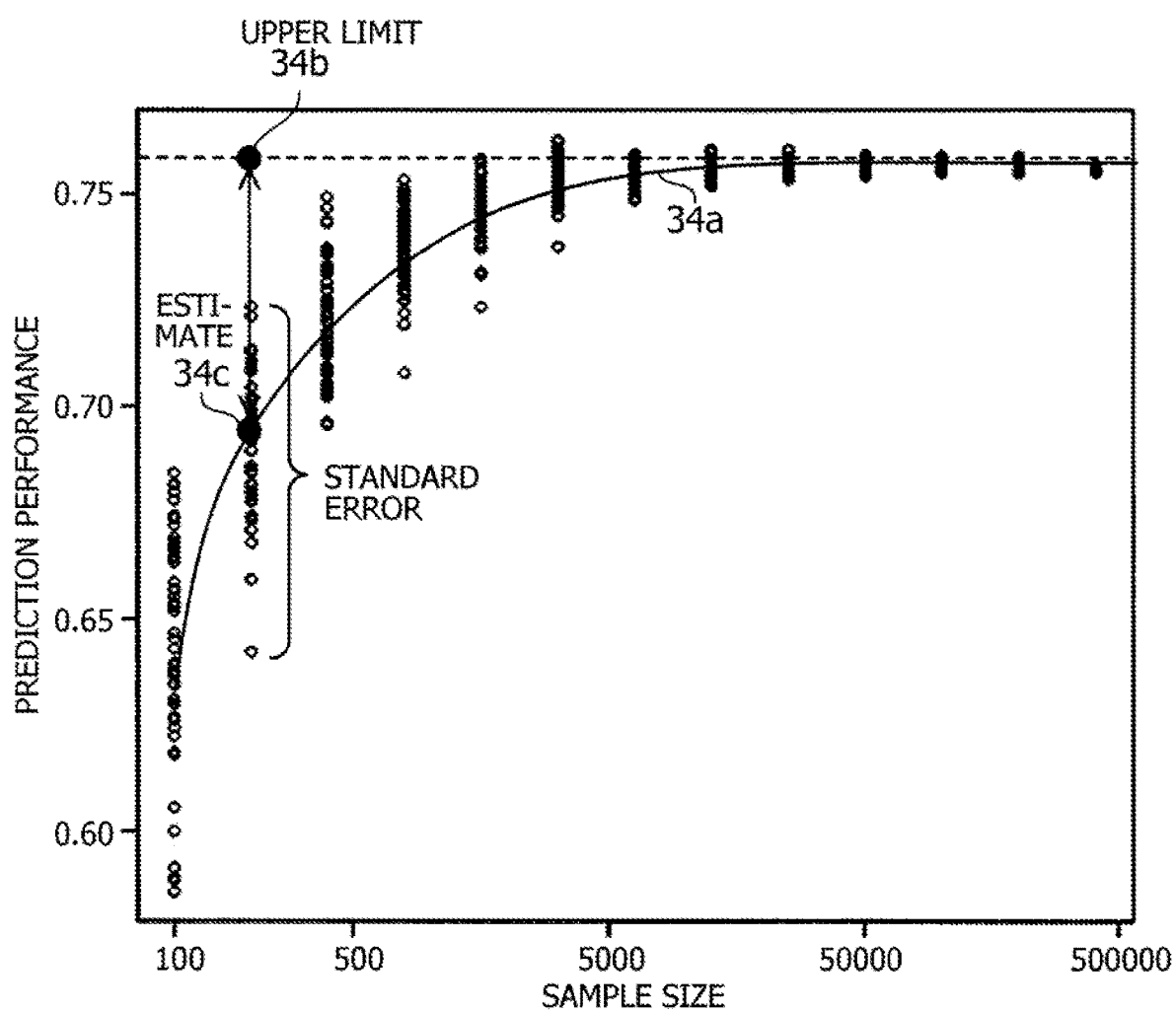

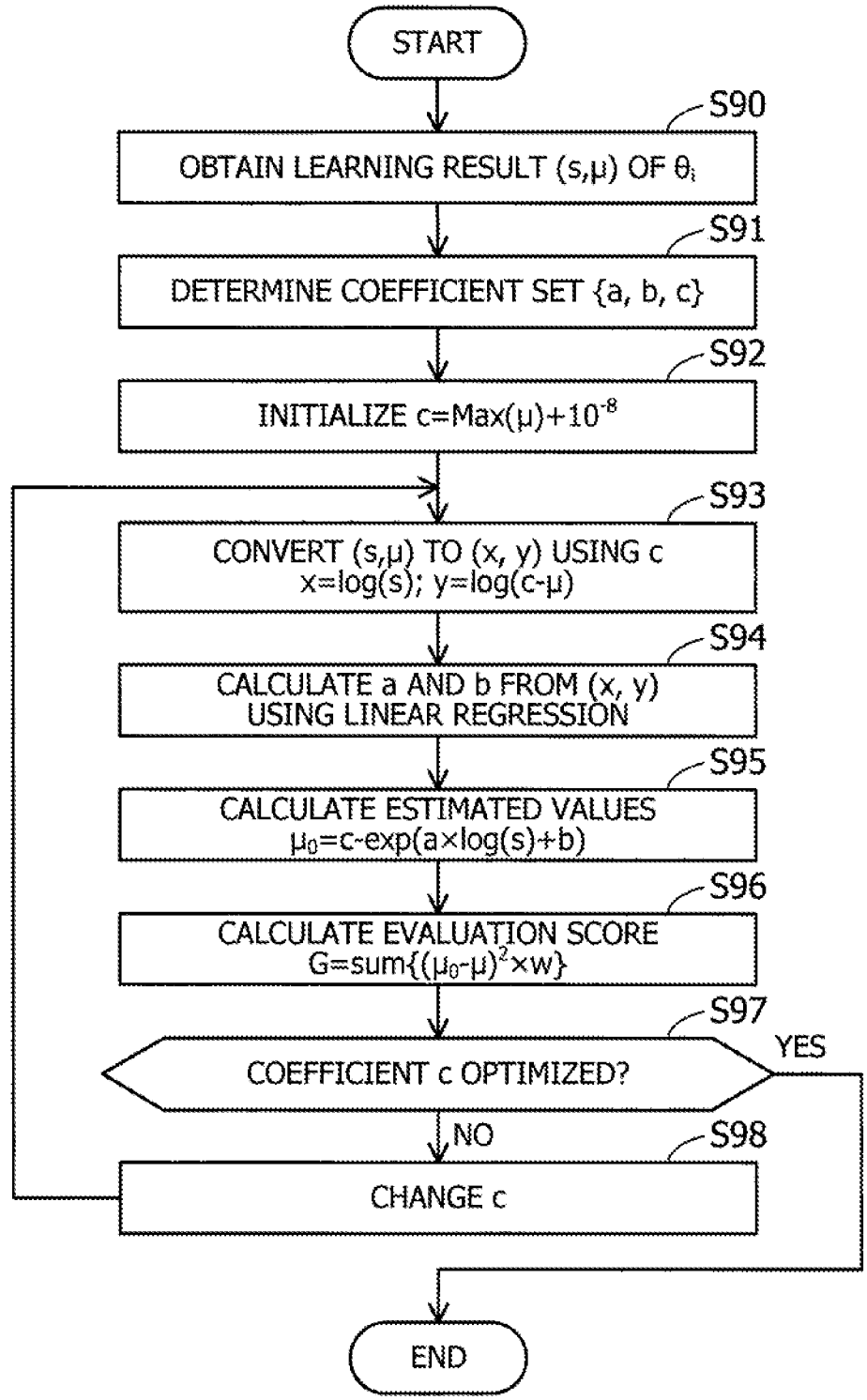
FIG. 25  GENERATE ESTIMATION FORMULA

METHOD AND APPARATUS FOR MANAGING MACHINE LEARNING PROCESS

CROSS-REFERENCE TO RELATED APPLICATION

This application is based upon and claims the benefit of priority of the prior Japanese Patent Application No. 2016-123405, filed on Jun. 22, 2016, the entire contents of which are incorporated herein by reference.

FIELD

The embodiments discussed herein relate to a method and apparatus for managing a machine learning process.

BACKGROUND

Machine learning is one of the techniques of computer-based data analysis. A computer receives training data that indicates a number of known instances as an input for a machine learning process. The computer learns a model that generalizes the relationship between a cause (called "explanatory variable" or "independent variable") and an outcome (called "response variable" or "dependent variable") by analyzing the training data. The learned model permits prediction of an outcome in an unknown instance. For example, a model for predicting a person's risk of diseases may be constructed by performing machine learning with training data collected through a survey of lifestyle and sickness of people. Another example is a model for predicting the future demand of products and services. This demand model may be learned by using past sales records of products and services as its training data.

Preferably, a machine-learned model has a high accuracy of prediction, or the ability of correctly predicting an outcome when an unknown instance is given. This ability is called "prediction performance." The prediction performance of a model will be enhanced as it is trained with more and more data. On the other hand, a model needs a longer learning time as its training data grows. In view of this, a progressive sampling method is proposed to efficiently train a model so that a practically sufficient prediction performance will be achieved.

According to a progressive sampling method, the computer first learns a model with small-size training data and then evaluates the model using test data prepared separately from the training data. The predicted outcome of the model is compared with the known outcome of each case given in the test data. If the model exhibits a poor prediction performance, the computer runs another round of model learning with larger training data and evaluates the resulting model again. The computer iterates these things until the prediction performance reaches a sufficient level. The progressive sampling avoids the use of excessively large training data and thus reduces the learning time of a model.

As an example of related art, some researchers propose a method of re-learning a support vector machine (SVM). The SVM is used in the technical field of detecting scene boundaries in a video, and the proposed method improves its prediction performance. Specifically, the re-learning method learns an SVM with a video as initial training data, generates additional training data by converting the initial training data in its brightness and contrast, and re-learns the SVM using both the initial training data and additional training data.

As another example, a learning device is proposed for efficient learning of a model even in the case where the training data and test data have different probability distributions. Specifically, the proposed learning device calculates a ratio between the generation probability of training data and that of test data. This ratio is used as a significance for weighting a loss function. The learning device learns a model using the weighted loss function dependent on the significance.

As yet another example, there is a predictive model learning device capable of learning a model with training data in which some components of explanatory variable vectors are missing. The proposed predictive model learning device divides the training data into groups according to the pattern of lacking components, and learns a plurality of models individually by using different groups. The device calculates a ratio of models being used and determines a final model, based on the learned models and the calculated usage ratio.

See, for example, the following documents: Japanese Laid-open Patent Publication No. 2009-217348; Japanese Laid-open Patent Publication No. 2010-92266; Japanese Laid-open Patent Publication No. 2015-60237; and Foster Provost, David Jensen, and Tim Oates, "Efficient Progressive Sampling", Proceedings of the 5th International Conference on Knowledge Discovery and Data Mining, pp. 23-32, Association for Computing Machinery (ACM), 1999.

Some machine learning algorithms have parameters for tuning their behaviors. These parameters are sometimes called "hyperparameters." For example, the radial basis function (RBF) kernel SVM has two parameters called "C" and "$\gamma$." With a change of these parameter values, the behavior of this machine learning algorithm may vary.

Changing parameter values may cause a machine learning algorithm to produce a different model that offers different prediction performance. It is difficult, however, to foresee what parameter values will deliver a high performance model, because the prediction performance of a model depends on the properties of training data used in machine learning. Accordingly, the computer has to repetitively execute machine learning cycles until it discovers optimal parameter values suitable for the training data.

The problem here is how to seek optimal parameter values more efficiently. Solution for this problem is desired particularly in the case where the size of training data may vary during the course of machine learning, as in the progressive sampling method mentioned above.

SUMMARY

In one aspect, there is provided a non-transitory computer-readable medium storing a program that causes a computer to perform a procedure including: obtaining a first measurement value representing prediction performance of a model that has been learned by using a first parameter value and training data of first size, the first parameter value being among a set of parameter values applicable to a machine learning algorithm; calculating, based on the first measurement value, a first expected value and a first variance degree of prediction performance of a model that would be learned by using the first parameter value and training data of second size; obtaining a second measurement value representing prediction performance of a model that has been learned by using a second parameter value and training data of the first size, the second parameter value being among the set of parameter values; calculating, based on the second measurement value, a second expected value and a second variance degree of prediction performance of a model that would be learned by using the second parameter value and training data of the second size; and calculating, based on the first and second expected values and the first and second variance degrees, a third expected value and a third variance degree of prediction performance of a model that would be learned by using a third parameter value and training data of the second size, the third parameter value being among the set of parameter values.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts a few graphs that illustrate exemplary relationships between hyperparameter and prediction performance;

FIG. 7 illustrates an example of a first learning progress screen;

FIG. 8 illustrates an example of a first estimation method for predicting performance;

FIG. 10 illustrates an example of a second estimation method for predicting performance;

FIG. 12 illustrates an example of a learning result table;

FIG. 13 illustrates an example of an intermediate estimation table;

FIG. 14 illustrates an example of an estimation table;

FIG. 22 illustrates a second exemplary progress screen of machine learning;

FIG. 24 is a graph that illustrates relationships among upper limit, estimates, and standard errors of prediction performance; and FIG. 25 is a flowchart that illustrates an exemplary procedure of generating estimation formulas.

DESCRIPTION OF EMBODIMENTS

Several embodiments will be described below with reference to the accompanying drawings.

(a) First Embodiment

Figure 1:
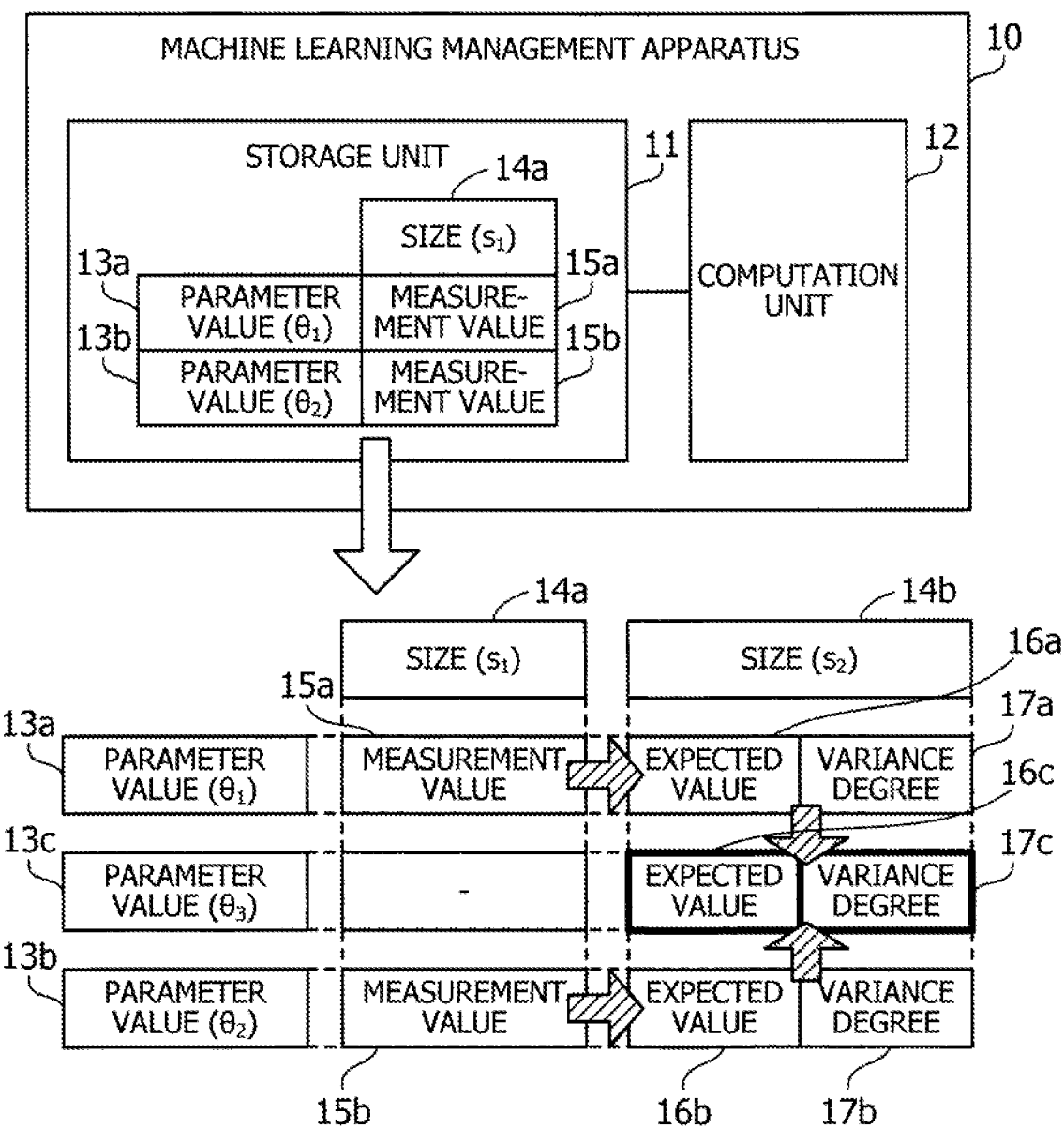
FIG. 1 illustrates an example of a machine learning management apparatus according to a first embodiment.

This section of the description is directed to a first embodiment. FIG. 1 illustrates an example of a machine learning management apparatus according to a first embodiment. The illustrated machine learning management apparatus 10 of the first embodiment manages progress of a machine learning process. Under the control of the machine learning management apparatus 10, the machine learning process constructs a model from training data that represents known instances. This model is to predict what outcome will be obtained in future unknown instances. Outcomes of machine learning may be used for various purposes, such as predicting a risk of diseases, forecasting future demands on products or services, and estimating manufacturing yield of a new product. The machine learning management apparatus 10 may execute machine learning by itself or may let some other apparatus do it. The machine learning management apparatus 10 may be a client computer that a user operates or may be a server computer to be accessed from client computers via a network.

The machine learning management apparatus 10 has a storage unit 11 and a computation unit 12. The storage unit 11 may be semiconductor memory devices, such as random access memory (RAM), or may be implemented by using non-volatile storage devices, such as a hard disk drive (HDD) and flash memory. The computation unit 12 may be, for example, a central processing unit (CPU), a digital signal processor (DSP), or any other processor. The computation unit 12 may include an application-specific integrated circuit (ASIC), a field-programmable gate array (FPGA), or any other electronic circuitry designed for specific purposes. The processor executes programs stored in RAM, storage unit 11, or other storage devices, and these programs include a machine learning management program. Here the term "processor" denotes a single processing device or a multiprocessor system including two or more processing devices.

The algorithms of machine learning include logistic regression analysis, support vector machine (SVM), and random forests. The behavior of such an algorithm may be tuned by changing its setup parameters. Those parameters of a machine learning algorithm (also called "hyperparameters") are given before the algorithm is initiated, as opposed to the coefficients of a model, which are determined through machine learning. For example, the random forest algorithm has a parameter for the number of decision trees to generate, and the regression analysis algorithm has a parameter specifying its fitting accuracy. The degree of a polynomial in a model is also among the parameters of this kind.

The storage unit 11 stores measurement values of prediction performance of existing models (i.e., results of machine learning that has already been performed). Prediction performance may be expressed in terms of, for example, accuracy, precision, or root mean squared error (RMSE). The measurement values stored in the storage unit include a first measurement value 15a and a second measurement value 15*b*. The first measurement value 15*a* represents the prediction performance of a model learned by applying a first parameter value 13*a* ($\theta_1$) to the machine learning algorithm and using training data of first size 14*a* ($s_1$). The second measurement value 15*b* represents the prediction performance of a model learned by applying a second parameter value 13*b* ($\theta_2$) to the machine learning algorithm and using training data of the first size 14*a*.

The computation unit 12 calculates a first expected value 16*a*, as well as a first variance degree 17*a*, of prediction performance on the basis of the first measurement value 15*a*. The first expected value 16*a* and first variance degree 17*a* indicate an estimate for prediction performance of a model that would be learned by applying the first parameter value 13*a* to a machine learning algorithm and using training data of second size 14*b* ($s_2$). Note that machine learning is not necessarily done, at the moment, for the combination of the first parameter value 13*a* and second size 14*b*. The computation unit 12 also calculates a second expected value 16*b*, as well as a second variance degree 17*b*, of prediction performance on the basis of the second measurement value 15*b*. The second expected value 16*b* and second variance degree 17*b* indicate an estimate for prediction performance of a model that would be learned by applying the second parameter value 13*b* to the machine learning algorithm and using training data of the second size 14*b*. Note that machine learning is not necessarily done, at the moment, for the combination of the second parameter value 13*b* and second size 14*b*.

Preferably, the second size 14*b* is larger than the first size 14*a*. For example, the first size 14*a* is 800 instances whereas the second size 14*b* is 1,600 instances. The first and second expected values 16*a* and 16*b* and first and second variance degrees 17*a* and 17*b* may be calculated through, for example, a regression analysis. The first and second expected values 16*a* and 16*b* may each be, for example, a mean of estimated values of prediction performance. The first and second variance degrees 17*a* and 17*b* may be represented in statistical terms, such as variance and standard deviation, indicating how much the estimates deviate around their mean.

As can be seen from the above, the computation unit 12 analyzes the relation in prediction performance between different sizes of training data while using the same parameter values, thus estimating variations of prediction performance as a function of training data size. Without a sufficient number of measurement values, however, the estimation of first and second expected values 16*a* and 16*b* may exhibit poor accuracy. The first and second measurement values 15*a* and 15*b* also include some amount of error that indicates deviations from theoretical values, and such error is caused by a sampling bias of training data, particularly in the case where the first size 14*a* is small. It is possible that the prediction performance may actually exceed the first and second expected values 16*a* and 16*b*. In consideration of this possibility, the computation unit 12 calculates variance degrees 17*a* and 17*b* in addition to expected values 16*a* and 16*b*.

Based on the first and second expected values 16*a* and 16*b* and first and second variance degrees 17*a* and 17*b*, the computation unit 12 calculates another expected value 16*c* (third expected value), as well as another variance degree 17*c* (third variance degree), of prediction performance. Specifically, the third expected value 16*c* and third variance degree 17*c* indicate an estimate for prediction performance of a model that would be learned by applying a third parameter value 13*c* ($\theta_3$) to the machine learning algorithm and using training data of the second size 14*b*. Note that machine learning is not necessarily done, at the moment, for this particular combination of the third parameter value 13*c* and second size 14*b*. Here the third expected value 16*c* and third variance degree 17*c* may be obtained through, for example, a regression analysis on the basis of closeness between the parameter values 13*a*, 13*b*, and 13*c*. The third expected value 16*c* may be, for example, a mean of estimates of prediction performance. The third variance degree 17*c* may be represented in statistical terms, such as variance and standard deviation, indicating how much the estimates deviate around their mean.

The computation unit 12 analyzes the relationships among different prediction performance values that are obtained from equally-sized training data, but with different parameter values, thus estimating how the prediction performance may vary depending on the parameter value. The data used for this analysis includes not only measurement values obtained as a result of machine learning, but also estimates for prediction performance that are calculated without actually performing machine learning. Just as it did for first and second variance degrees 17*a* and 17*b*, the computation unit 12 calculates a third variance degree 17*c* in addition to the third expected value 16*c*, considering the possibility that the prediction performance may exceed the third expected value 16*c*.

When calculating a third variance degree 17*c*, the computation unit 12 takes into consideration the first and second variance degrees 17*a* and 17*b* besides the first and second expected values 16*a* and 16*b*. It would also be possible to calculate a third variance degree 17*c* only from first and second expected values 16*a* and 16*b* using regression techniques, without considering first and second variance degrees 17*a* and 17*b*. This calculation method, however, neglects the fact that the first and second expected values 16*a* and 16*b* contain some estimation errors. The resulting third variance degree 17*c* would therefore be unreasonably small even if the estimates had large variance degrees 17*a* and 17*b*. Accordingly, the computation unit 12 takes into consideration the first and second variance degrees 17*a* and 17*b* when calculating a third variance degree 17*c*.

For example, the computation unit 12 extracts sample values from the distribution of prediction performance with respect to the first parameter value 13*a*, on the basis of the first expected value 16*a* and first variance degree 17*a*. The computation unit 12 also extracts sample values from the distribution of prediction performance with respect to the second parameter value 13*b*, on the basis of the second expected value 16*b* and second variance degree 17*b*. The computation unit 12 then executes a regression analysis with the extracted sample values, thus calculating a deviation of estimates in the case of a third parameter value 13*c*. The above sample extraction may involve a process of Monte Carlo simulation. Also, the computation unit 12 may calculate a third expected value 16*c* and a third variance degree 17*c* directly from the first and second expected values 16*a* and 16*b* and first and second variance degrees 17*a* and 17*b* according to specific equations that implement an estimation method using a Gaussian process. With consideration of the first and second variance degrees 17*a* and 17*b*, the third variance degree 17*c* will have a larger value than in the case without such consideration.

The computation unit 12 may determine which parameter value to use in the next round of machine learning, based on the expected values 16*a* 16*b*, and 16*c* and variance degrees 17*a*, 17*b*, and 17*c* calculated above. For example, the computation unit 12 calculates a certain reference value for prediction performance, on the basis of the third expected value 16c and third variance degree 17c, the reference value being larger than the third expected value 16c. For example, the reference value may be the upper confidence bound (UCB) of 95% prediction interval. Then based on the calculated reference value, the computation unit 12 determines whether to perform machine learning with the third parameter value 13c in combination with the second size 14b.

In the above example of FIG. 1, the computation unit 12 calculates a third expected value 16c and a third variance degree 17c with respect to a third parameter value 13c, from a first expected value 16a and a first variance degree 17a corresponding to a first parameter value 13a and a second expected value 16b and a second variance degree 17b corresponding to a second parameter value 13b. It may also be possible to calculate a third expected value 16c and a third variance degree 17c from expected values and variance degrees corresponding to three or more parameter values. Also, when there are measurement values of prediction performance as a result of machine learning executed with the combination of another parameter value and the second size 14b, the machine learning management apparatus 10 may calculate a third expected value 16c and a third variance degree 17c by using these existing measurement values in addition to the first and second expected values 16a and 16b and first and second variance degrees 17a and 17b.

In operation of the first embodiment described above, the proposed machine learning management apparatus 10 calculates a first expected value 16a and a first variance degree 17a corresponding to the combination of a first parameter value 13a and second size 14b, based on a first measurement value 15a corresponding to the combination of the first parameter value 13a and first size 14a. The machine learning management apparatus 10 also calculates a second expected value 16b and a second variance degree 17b corresponding to the combination of a second parameter value 13b and the second size 14b, based on a second measurement value 15b corresponding to the combination of the second parameter value 13b and the first size 14a. The machine learning management apparatus 10 further calculates a third expected value 16c and third variance degree 17c corresponding to the combination of a third parameter value 13c and the second size 14b, based on the first and second expected values 16a and 16b and the first and second variance degrees 17a and 17b.

The first embodiment makes it possible to estimate prediction performance of a model that would be constructed by machine learning with a third parameter value 13c, without actually performing such machine learning. This feature permits efficient search for a good parameter value that improves the model's prediction performance. Also, the calculation of a third variance degree 17c is based on the first and second variance degrees 17a and 17b, thus preventing the third variance degree 17c from being underestimated. In other words, it is less likely to overlook potential performance improvement of the third parameter value 13c.

(b) Second Embodiment

Figure 2:
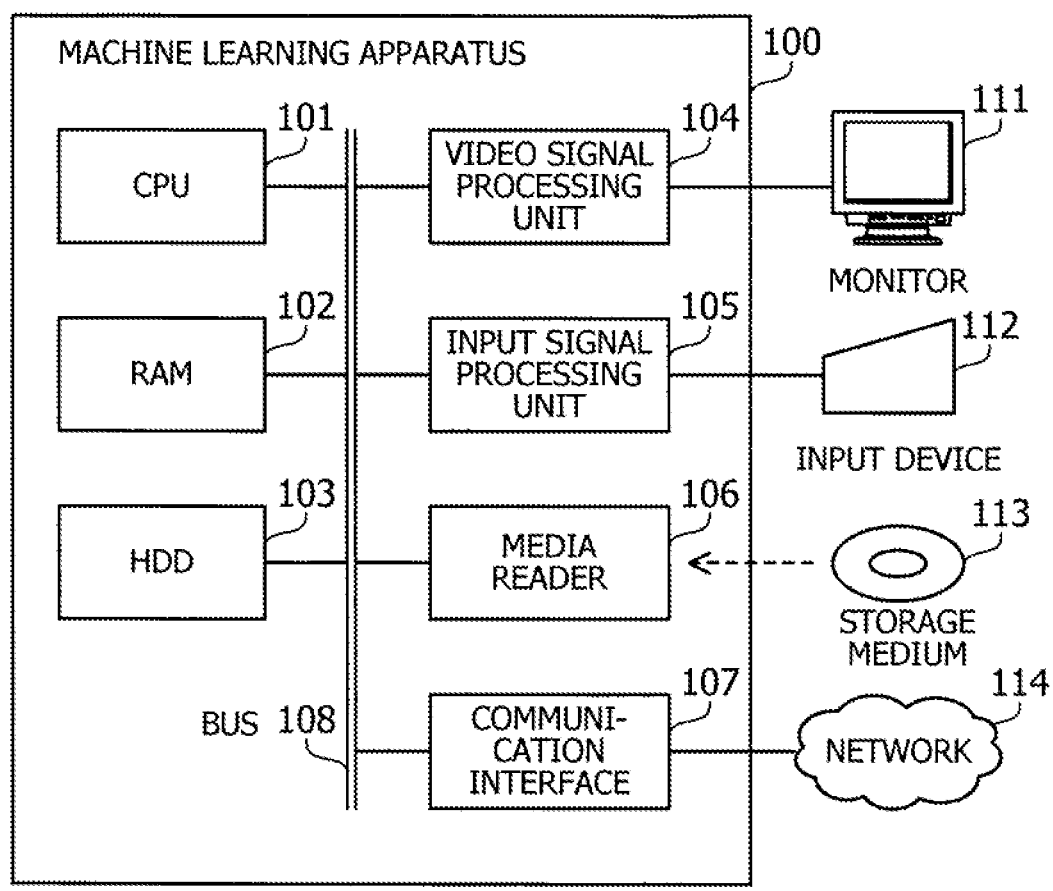
FIG. 2 is a block diagram that illustrates an exemplary hardware configuration of a machine learning apparatus.

This section of the description is directed to a second embodiment. FIG. 2 is a block diagram that illustrates an exemplary hardware configuration of a machine learning apparatus. The illustrated machine learning apparatus 100 in FIG. 2 includes a CPU 101, a RAM 102, an HDD 103, a video signal processing unit 104, an input signal processing unit 105, a media reader 106, and a communication interface 107. All the named components are connected to a bus 108. The machine learning apparatus 100 is an exemplary implementation of the foregoing machine learning management apparatus 10 in the first embodiment. The CPU 101 corresponds to the computation unit 12 in the first embodiment, and the RAM 102 or HDD 103 corresponds to the storage unit 11 in the same.

The CPU 101 is a processor that executes programmed instructions. The CPU 101 reads out at least part of program and data files stored in the HDD 103 and executes programs after loading them on the RAM 102. The CPU 101 may include a plurality of processor cores, and the machine learning apparatus 100 may include two or more processors. These processors or processor cores may be used to execute processing operations (described later) in parallel. The term "processor" is used to refer to a single processing device or a multiprocessor system including two or more processing devices.

The RAM 102 is a volatile semiconductor memory device that temporarily stores programs that the CPU 101 executes, as well as various data objects that the CPU 101 manipulates in the course of computation. Other type of memory devices may be used in place of or together with the RAM 102, and the machine learning apparatus 100 may have two or more sets of such memory devices.

The HDD 103 serves as a non-volatile storage device to store program and data files of the operating system (OS), middleware, applications, and other kinds of software. A machine learning management program is one of these programs. The machine learning apparatus 100 may include a plurality of non-volatile storage devices such as flash memories and solid state drives (SSD) in place of, or together with the HDD 103.

The video signal processing unit 104 produces video images in accordance with commands from the CPU 101 and outputs them on a screen of a monitor 111 coupled to the machine learning apparatus 100. The monitor 111 may be, for example, a cathode ray tube (CRT) display, liquid crystal display (LCD), plasma display panel (PDP), organic electro-luminescence (OEL) display, or other display device.

The input signal processing unit 105 receives input signals from input devices 112 coupled to the machine learning apparatus 100 and supplies them to the CPU 101. The input devices 112 include pointing devices (e.g., mouse, touch-screen, touchpad, trackball), keyboards, remote controllers, push button switches, and the like. The machine learning apparatus 100 allows connection of two or more input devices of different categories.

The media reader 106 is a device used to read programs and data stored in storage media 113. The storage media 113 include, for example, magnetic disk media such as flexible disk (FD) and HDD, optical disc media such as compact disc (CD) and digital versatile disc (DVD), magneto-optical discs (MO), and semiconductor memory devices. The media reader 106 transfers programs and data read out of such a storage medium 113 to, for example, the RAM 102 or HDD 103.

The communication interface 107 is connected to a network 114, allowing the CPU 101 to communicate with other information processing apparatuses (not illustrated) via the network 114. The communication interface 107 may be a wired network interface or a wireless network interface. In the former case, the communication interface 107 is connected to a network device (e.g., switch) via a cable. In the latter case, the communication interface 107 is connected to a base station via a radio link.

The description will now provide an explanation for relationships among sample sizes, prediction performance, and hyperparameters in machine learning, as well as for a progressive sampling method.

According to the second embodiment, the process of machine learning assumes the use of a collection of unit datasets that represent known instances. These datasets may be collected by the machine learning apparatus 100 itself or another information processing apparatus, from various devices (e.g., sensor devices) via the network 114. The collected data may be called "big data" because of its large data size. Each unit dataset normally includes two or more values of explanatory variables and one value of a response variable. Suppose, for example, that machine learning is used to predict the demand for a product. The product's track records are collected in this case, each of which describes temperature, humidity, and other factors that could affect demand for the product (as the explanatory variables) and the observed demand for the product (as the response variable).

The machine learning apparatus 100 samples some unit datasets out of the collected data and uses them as the training data for learning a model. Generally, a model includes two or more explanatory variables and one response variable and indicates how the response variable is related to the explanatory variables. Models are expressed in the form of mathematical equations, such as linear equations, second (or higher) degree polynomial equations, exponential functions, and logarithmic functions. The user may specify what form of equation to use before starting a machine learning process. The coefficients of the specified equation are determined from training data through machine learning.

A learned model permits the machine learning apparatus 100 to predict a value of the response variable (outcome) from values of explanatory variables (causes) when an unknown instance is given as an input. For example, the machine learning apparatus 100 predicts the demand for a product in the forthcoming year from weather forecasts in the same year. The model output its result in the form of a continuous number (e.g., probability value between zero and one) or a discrete number (e.g., binary value such as YES and NO).

Prediction performance of a model is calculated when the learning is done. The term "prediction performance" denotes the model's ability to predict the result of an unknown instance correctly, which may thus be called "accuracy." The machine learning apparatus 100 extracts, out of collected data, unit datasets other than those of training data and uses them as test data for calculating prediction performance of the model. For example, test data may be about half the size of training data. The machine learning apparatus 100 enters explanatory variable values in the test data to the model and compares its output (i.e., predicted value) with the corresponding response variable value (i.e., actual value) in the test data. This act of evaluating prediction performance of a learned model may be referred to as "validation."

Prediction performance may be indicated in terms of accuracy, precision, or mean square error (RMSE). Suppose now that a model outputs result values in binary form, YES and NO, and that the test data includes N sample instances. Let Tp be the number of instances in which both the predicted value and actual value are YES. Let Fp be the number of instances in which the predicted value is YES whereas the actual value is NO. Let Fn be the number of instances in which the predicted value is NO whereas the actual value is YES. Let Tn be the number of instances in which both the predicted value and actual value are NO. Here, the accuracy is calculated as (Tp+Tn)/N, which means the ratio of correct predictions (YES or NO) to all instances. The precision is, on the other hand, calculated as Tp/(Tp+Fp), which means the probability that "YES" is predicted correctly. The RMSE is calculated as $(sum(y-\hat{y})^2/N)^{1/2}$, where y is the actual value and $\hat{y}$ is the predicted value in an individual instance.

The second embodiment assumes that a single particular algorithm is used to perform machine learning. Which machine learning algorithm to use may be specified by the user or may be selected by the machine learning apparatus 100 itself. The machine learning apparatus 100 may use several different machine learning algorithms depending on the purpose. Such machine learning algorithms include, for example, logistic regression analysis, support vector machine (SVM), and random forests. Each of these algorithms will be described briefly below.

Logistic regression analysis is a regression algorithm that tries to fit values of response variable y and explanatory variables $x_1, x_2, \ldots x_k$ to an S-shaped curve. It is assumed that response variable y is associated with explanatory variables $x_1, x_2, \ldots, x_k$ as in $\log(y/(1-y))=a_1x_1+a_2x_2+\ldots+a_kx_k+b$. Coefficients $a_1, a_2, \ldots, a_k$, and b are determined by a regression analysis.

Support vector machine is a machine learning algorithm for calculating a boundary plane that divides a collection of unit datasets placed in an N-dimensional space into two classes in the most distinct manner. Specifically, the boundary is calculated such that its distances (margins) from each class may be maximized.

Random forests are a machine learning algorithm that constructs a model for classifying unit datasets in an appropriate manner. According to this algorithm, unit datasets are sampled randomly from the population, and the sampled unit datasets are classified according to the values of some explanatory variables that have been randomly selected. The algorithm repetitively executes selection of explanatory variables and classification of unit datasets, thereby generating a hierarchical decision tree based on the values of explanatory variables. The algorithm yields a multitude of decision trees by repeating unit dataset sampling and decision tree generation. These decision trees are finally combined into a model for classification of unit datasets.

Machine learning algorithms have hyperparameters to manage their own behavior. Unlike the coefficients of models, the hyperparameters of a machine learning algorithm are not determined through the machine learning process itself, but are given before the machine learning algorithm is executed. For example, the number of decision trees to be generated is a hyperparameter in the case of random forest algorithms. Other examples of hyperparameters include a fitting accuracy in regression analysis, and the degree of a polynomial in a model. In general, the prediction performance of a model increases with the sample size (i.e., the number of unit datasets sampled as training data), under the condition that the hyperparameter values are fixed.

Figure 3:
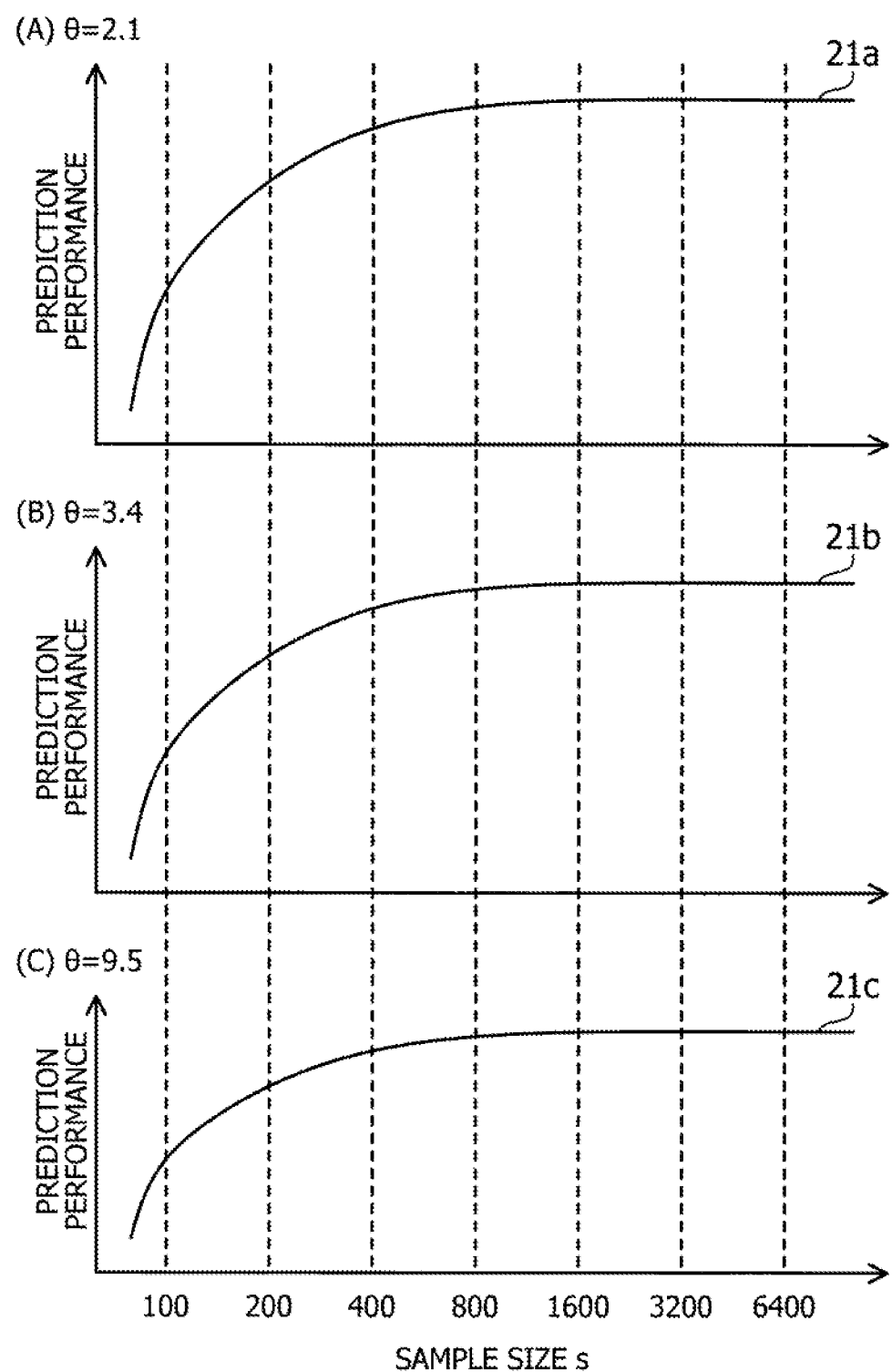
FIG. 3 depicts a few graphs that illustrate exemplary relationships between sample size and prediction performance.

FIG. 3 depicts a few graphs that illustrate exemplary relationships between sample size and prediction performance. Specifically, FIG. 3 gives three curves 21a, 21b, and 21c. The topmost curve 21a in FIG. 3 represents a relationship between sample size and prediction performance when hyperparameter θ is 2.1. The middle curve 21b represents a relationship between the same when hyperparameter θ is 3.4. The bottommost curve 21c represents a relationship between the same when hyperparameter θ is 9.5.

The above three curves 21a, 21b, and 21c demonstrate that the prediction performance rises as the sample size increases, regardless of hyperparameter values. Specifically, the prediction performance exhibits a significant increase with sample size while the performance is relatively small. The prediction performance, on the other hand, appears to have an upper limit. Its slope (i.e., the ratio of a performance increase to a sample size increase) gradually decreases as the prediction performance approaches the limit. Although it is not explicitly seen in FIG. 3, the learning time grows as the sample size becomes larger. This means that too large sample sizes would spoil the efficiency of machine learning in terms of learning time.

The upper limit of prediction performance may vary depending on what value is given to hyperparameter $\theta$ of the machine learning algorithm. Referring to the above example of FIG. 3, the upper limit in the case of $\theta=3.4$ is higher than in the case of $\theta=9.5$, and the upper limit in the case of $\theta=2.1$ is even higher than in the case of $\theta=3.4$.

The relationship between sample size and prediction performance may, however, vary depending on the nature of training data (or the type of training data), even if the same hyperparameter value is used for machine learning. Relative differences in prediction performance between different hyperparameter values may also vary with the nature of training data. These facts make it difficult to determine the optimal values of hyperparameters for maximum performance before starting a machine learning process. It is also difficult, for the same reasons, to discover a minimum sample size that brings the prediction performance to its upper limit or close to it. Accordingly, the machine learning process has to try several different combinations of hyperparameter value and sample size, so as to seek an optimal combination that efficiently delivers a high-performance model.

FIG. 4 depicts a few graphs that illustrate exemplary relationships between hyperparameter and prediction performance. Specifically, FIG. 4 gives three curves 22a, 22b, and 22c to illustrate variations of prediction performance from a different perspective (i.e., using a different horizontal axis from FIG. 3). The topmost curve 22a in FIG. 4 represents a relationship between hyperparameter $\theta$ and prediction performance in the case where sample size s is 200. The middle curve 22b represents the same in the case of s=800. The bottommost curve 22c represents the same in the case of s=3200.

Referring to the exemplary curves 22a, 22b, and 22c, the prediction performance at $\theta=7.6$ is higher than that at $\theta=9.5$ when the sample size is fixed. The prediction performance at $\theta=5.2$ is even higher than that at $\theta=7.6$. The prediction performance at $\theta=3.4$ is even higher than that at $\theta=5.2$. The prediction performance at $\theta=2.1$ is even higher than that at $\theta=3.4$. The prediction performance increases with the sample size, which is true in the entire range of hyperparameter $\theta$.

In the particular example of FIG. 4, the prediction performance decreases as the hyperparameter value increases, and that tendency is common to all different sample sizes. In other cases, however, the prediction performance may exhibit a different behavior as to the sample size dependency. For example, it may be possible that prediction performance at $\theta=9.5$ is greater than that at $\theta=7.6$ when sample size s is 200, whereas prediction performance at $\theta=9.5$ is smaller than that at $\theta=7.6$ when sample size s is 800.

Figure 5:
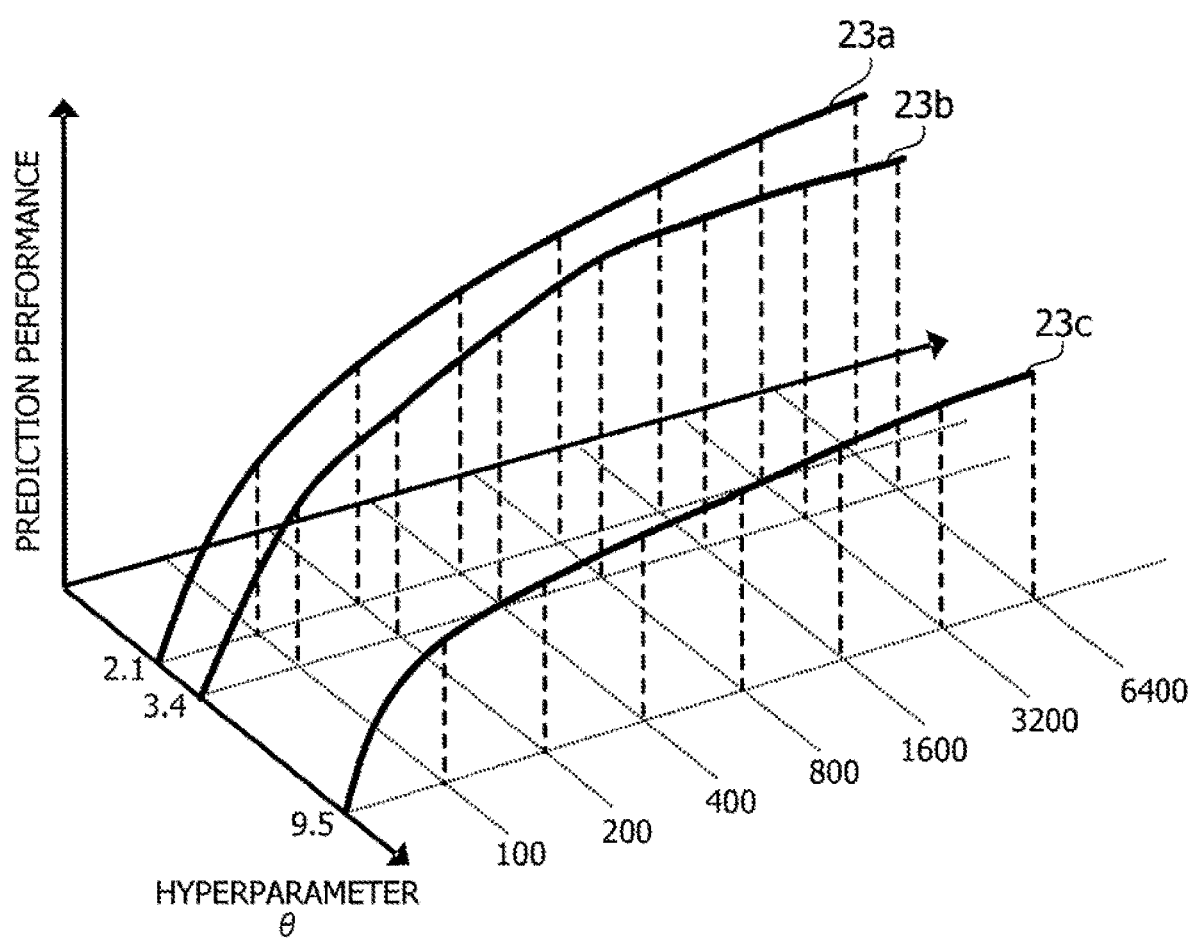
FIG. 5 is an exemplary three-dimensional graph that illustrates how the prediction performance changes.

FIG. 5 is an exemplary three-dimensional graph that illustrates how the prediction performance changes. Specifically, FIG. 5 illustrates three curves 23a, 23b, and 23c. The backmost curve 23a represents a relationship between sample size and prediction performance in the case where hyperparameter $\theta$ is 2.1. This curve 23a corresponds to the topmost curve 21a discussed in FIG. 3. The middle curve 23b in FIG. 5 represents a relationship between sample size and prediction performance in the case where hyperparameter $\theta$ is 3.4. This curve 23b corresponds to the middle curve 21b discussed in FIG. 3. The frontmost curve 23c in FIG. 5 represents a relationship between sample size and prediction performance in the case where hyperparameter $\theta$ is 9.5. This curve 23c corresponds to the bottommost curve 21c discussed in FIG. 3. Referring again to FIG. 4, the topmost curve 22a is equivalent to what is cut out of FIG. 5 on the plane of sample size s=200. The middle curve 22b in FIG. 4 is equivalent to what is cut out of FIG. 5 on the plane of sample size s=800. Further, the bottommost curve 22c in FIG. 4 is equivalent to what is cut out of FIG. 5 on the plane of sample size s=3200.

None of the above-described relationships among hyperparameter $\theta$, sample sizes, and prediction performance is known before machine learning is started. Accordingly, the machine learning apparatus 100 performs several trials of machine learning with small sample sizes and uses their learning results to estimate the curves as in FIG. 5, thereby narrowing down the reasonable combinations of a hyperparameter value and a sample size for the purpose of future machine learning. To this end, the machine learning apparatus 100 applies a progressive sampling method to seek an optimal hyperparameter value among a plurality of choices.

Figure 6:
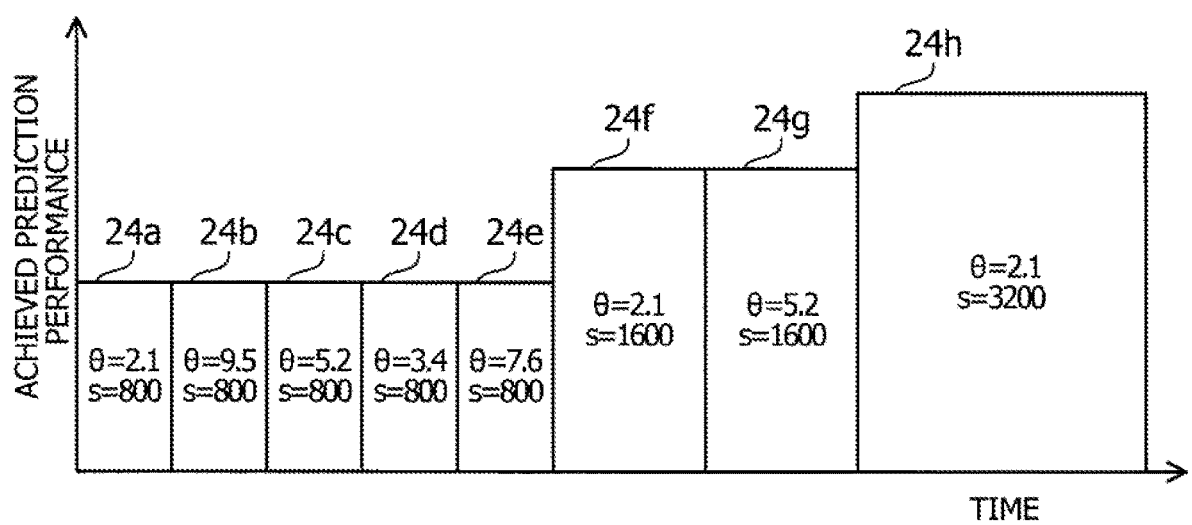
FIG. 6 illustrates a first example of how the prediction performance varies during the course of a progressive sampling method.

FIG. 6 illustrates a first example of how the prediction performance varies during the course of a progressive sampling method. The machine learning apparatus 100 executes multiple machine learning cycles one after another, each with one specific hyperparameter value and one specific sample size. Each such cycle is referred to herein as a "learning step." Every time a single learning step is finished, the machine learning apparatus 100 dynamically selects a new combination of a hyperparameter value and a sample size for the next learning step on the basis of the results of previous learning steps. This selection is, however, not exhaustive. That is, it is unlike the case of repeating machine learning cycles using all applicable hyperparameter values and sample sizes in combination. Rather, the proposed machine learning apparatus 100 is designed to narrow down the choices for such combinations, as the machine learning process goes on.

Referring to the example of FIG. 6, the machine learning apparatus 100 begins with a first learning step 24a, setting up the algorithm with $\theta=2.1$ and s=100. In the beginning stage where the sample size is small, the machine learning apparatus 100 is allowed to try multiple sample sizes at a time, in combination with a single hyperparameter value, so that it will be able to properly forecast how the prediction performance varies as the sample size increases. The first learning step 24a successively executes machine learning with four different sample sizes s=100, 200, 400, and 800 in combination with $\theta=2.1$.

The machine learning apparatus 100 then proceeds to a second learning step 24b. This second learning step 24b similarly covers four different sample sizes s=100, s=200, s=400, and s=800 in combination with $\theta=9.5$. The machine learning apparatus 100 also executes a third learning step 24c, which covers four different sample sizes s=100, 200, 400, and 800 in combination with $\theta=5.2$. The machine learning apparatus 100 further executes a fourth learning step 24d, which covers four different sample sizes s=100, 200, 400, and 800 in combination with $\theta=3.4$. The machine learning apparatus 100 similarly executes a fifth learning step 24e, which covers four different sample sizes s=100, 200, 400, and 800 in combination with θ=7.6.

The machine learning apparatus 100 now moves to a sixth learning step 24f, in which the machine learning is executed with a setup of θ=2.1 and s=1600. The machine learning apparatus 100 also executes a seventh learning steps 24g with a setup of θ=5.2 and s=1600. The machine learning apparatus 100 further executes an eighth learning step 24h with a setup of θ=2.1 and s=3200. The machine learning apparatus 100 may skip learning steps of θ=3.4, θ=7.6, and θ=9.5, in combination with s=1600, if it finds prediction performance improvement unlikely.

Within a single learning step, the machine learning apparatus 100 constructs a model by using training data and evaluates its prediction performance by using test data. To this end, the machine learning apparatus 100 implements a model validation method, such as cross-validation and random-sampling validation.

For example, the machine learning apparatus 100 may perform a cross-validation method as follows. First, the machine learning apparatus 100 divides sampled data into M blocks, where M is an integer greater than one. M−1 blocks are used as training data, and the remaining one block is used as test data. The machine learning apparatus 100 repeats model learning and performance evaluation M times, while changing the selection of a test data block. The outcome of each single learning step is the most-performing one of the M models and the mean of M values of prediction performance. The cross-validation method enables evaluation of prediction performance even when the amount of data is limited.

As another example, the machine learning apparatus 100 may perform a random-sampling validation method as follows. The machine learning apparatus 100 randomly samples training data and test data from a given population of data. Then the machine learning apparatus 100 learns a model by using training data and calculates prediction performance of the model by using test data. These operations of sampling data, constructing a model, and evaluating prediction performance are repeated M times. Here the above-noted sampling operation samples data "without replacement." That is, each sampled set of training data does not include duplicates of the same unit dataset, and the same is true for each sampled set of test data. Also, each single sampling never enters the same unit dataset to both the training data and test data. M sampling sessions are, however, allowed to select the same unit dataset multiple times. The outcome of each single learning step is the most-performing one of the M models and the mean of M values of prediction performance.

As mentioned above, the machine learning apparatus 100 selects a new combination of a hyperparameter value and a sample size for use in the next learning step. This selection is actually done by estimating a speed of performance improvement (referred to as the "improvement speed") with respect to different hyperparameter values and extracting the fastest hyperparameter value. When a hyperparameter value is selected, the machine learning apparatus 100 takes a sample size that is one tick greater than the past sample sizes and executes a new learning step with that combination. The machine learning apparatus 100 reviews the improvement speed each time before it proceeds to the next learning step.

The improvement speed is estimated by dividing an estimated performance improvement by an estimated execution time. The estimated performance improvement is a difference between an estimate of prediction performance in the case of a large sample size and a maximum prediction performance that has been achieved, so far, as a result of machine learning with various hyperparameter values. The maximum prediction performance at the moment may be referred to also as "achieved prediction performance." The estimated execution time is an expected time of machine learning executed with a large sample size. Here, the hyperparameter values are classified into two groups: those that have once been subjected to a learning step (referred to as "executed" hyperparameter values), and those that have not yet been subjected to machine learning (referred to as "unexecuted" hyperparameter values). In the case of an executed hyperparameter value combined with a new sample size, the corresponding prediction performance and execution time are estimated from the measurement values of prediction performance and execution time that were previously obtained with that hyperparameter value in combination with smaller sample sizes. In the case of an unexecuted hyperparameter value, the prediction performance and execution time are estimated on the basis of prediction performance and execution times of other hyperparameter values.

The machine learning apparatus 100 estimates prediction performance and execution time for each combination of an unexecuted hyperparameter value and a specific sample size. The machine learning apparatus 100 also estimates a performance improvement from the above estimates of prediction performance and the achieved prediction performance at present. Further, the machine learning apparatus 100 estimates a cumulative execution time by accumulating estimates of execution time of machine learning with respect to unexecuted sample sizes. In this way, the performance improvement and cumulative execution time are estimated in this way, for each combination of an unexecuted hyperparameter value and a sample size.

For each combination of an unexecuted hyperparameter value and a sample size, the machine learning apparatus 100 calculates an indicator value by dividing its estimated performance improvement by its estimated cumulative execution time. The machine learning apparatus 100 then selects one of the indicator values corresponding to different sample sizes in combination with the same hyperparameter value, and uses the selected indicator value as an estimated improvement speed as to the noted hyperparameter value. For example, the machine learning apparatus 100 selects, as an estimated improvement speed, an indicator value that has the smallest sample size among the group of indicator values that are greater than a certain threshold. As another example of an estimated improvement speed, the machine learning apparatus 100 may select an indicator value that corresponds to the largest sample size.

Referring to the example of FIG. 6, the machine learning apparatus 100 calculates improvement speeds of individual hyperparameter values after the first learning step 24a and selects θ=9.5 for the next learning step because it exhibits the highest improvement speed. The machine learning apparatus 100 also calculates improvement speeds of individual hyperparameter values after the second learning step 24b and selects θ=5.2 for the next learning step because it exhibits the highest improvement speed. Likewise, the machine learning apparatus 100 selects θ=3.4 with the highest improvement speed after the third learning step 24c, and selects θ=7.6 with the highest improvement speed after the fourth learning step 24d. The machine learning apparatus 100 further selects θ=2.1 with the highest improvement speed after the fifth learning step 24e, selects θ=5.2 with the highest improvement speed after the sixth learning step 24f, and then selects θ=2.1 with the highest improvement speed after the seventh learning step 24g.

It would be preferable that the process of estimating performance improvements takes statistical errors into consideration, so that the process would be free from the risk of dropping, in an earlier stage, hyperparameters that may otherwise improve the prediction performance. In view of this, the machine learning apparatus 100 may be configured to calculate an expected value of the performance, together with its 95% prediction interval, and takes the upper confidence bound (UCB) of the 95% prediction interval as an estimate of prediction performance for use in calculating a performance improvement. Here, the 95% prediction interval indicates a dispersion of prediction performance values (measurement values), and more specifically, it denotes the interval in which the new estimate of prediction performance falls with a probability of 95%. That is, the prediction performance value used in this case equals to the statistically expected value plus a statistical error.

As an alternative to the UCB described above, the machine learning apparatus 100 may use the probability of improvement (PI) indicating the likeliness that the prediction performance in question will exceed the achieved prediction performance. This PI is calculated as an integral of the assumed distribution of prediction performance. The machine learning apparatus 100 may also calculate an expected improvement (EI) that estimates prediction performance exceeding the achieved prediction performance, by integrating the assumed distribution of prediction performance.

FIG. 7 illustrates an example of a first learning progress screen. The machine learning apparatus 100 may display a learning progress screen 25 on the monitor 111 during the course of machine learning. Specifically, this learning progress screen 25 indicates the execution order of learning steps by presenting a table that has a plurality of hyperparameter values in the row header and a plurality of sample sizes in the column header. As the machine learning process moves on, the machine learning apparatus 100 adds a numerical value to the table in the learning progress screen 25 so as to indicate which learning step is being executed.

For example, order number "1" appears on the learning progress screen 25 when a learning step with θ=2.1 and s≤800 begins. Order number "2" appears on the learning progress screen 25 when a learning step with θ=9.5 and s≤800 begins. Similarly, order number "3" appears when a learning step with θ=5.2 and s≤800 begins. Order number "4" appears when a learning step with θ=3.4 and s≤800 begins. Order number "5" appears when a learning step with θ=7.6 and s≤800 begins. Order number "6" appears when a learning step with θ=2.1 and s=1600 begins. Order number "7" appears when a learning step with θ=5.2 and s=1600 begins. Order number "8" appears when a learning step with θ=2.1 and s=3200 begins. Order number "9" appears when a learning step with θ=3.4 and s=1600 begins.

The description will now turns to a method for estimating prediction performance. FIG. 8 illustrates an example of a first estimation method for predicting performance. This first estimation method is an example of simple performance estimation techniques. Specifically, FIG. 8 illustrates a matrix 26 according to the first estimation method. It is assumed here that the machine learning apparatus 100 has already executed learning steps with θ=2.1 and s=100 to 3200, as well as with θ=9.5 and s=100 to 800, whereas other setups including θ=2.1 and s=6400, θ=3.4 and s=100 to 6400, and θ=9.5 and s=1600 to 6400 are still pending.

Referring to the matrix 26 of FIG. 8, the machine learning apparatus 100 estimates prediction performance at the point of θ=2.1 and s=6400 by performing a regression analysis because it has already done one or more learning steps with θ=2.1. More specifically, the prediction performance in question is estimated from the existing measurement values obtained with respect to the same hyperparameter value θ=2.1 in combination with different sample sizes s=100, 200, 400, 800, 1600, and 3200. As mentioned above, performance improvements are calculated in consideration of their possible positive deviation due to statistical error. For this reason, the machine learning apparatus 100 calculates the standard deviation of prediction performance in addition to the mean of the same. The mean represents an expected value of prediction performance, and the standard deviation represents a variance degree of the same. In the example of FIG. 8, the machine learning apparatus 100 estimates that the prediction performance will have a mean of 0.94 and a standard deviation of 0.02 when θ=2.1 and s=6400. This estimate is made on the basis of measurement values at the points of θ=2.1 and s=100 to 3200.

Similarly to the above estimation, the machine learning apparatus 100 is able to estimate prediction performance at the points of θ=9.5 and s=1600 to 6400 by performing a regression analysis on existing measurement values, because it has already done one or more learning steps with the same hyperparameter θ=9.5 in combination with some different sample sizes. Specifically, it is estimated in the example of FIG. 8 that the prediction performance will have a mean of 0.72 and a standard deviation of 0.01 when θ=9.5 and s=1600 to 6400. This estimate is made on the basis of measurement values at the points of θ=9.5 and s=100 to 800.

The machine learning apparatus 100, on the other hand, has not done any learning steps with respect to a hyperparameter θ of 3.4. Accordingly, the prediction performance at the points of θ=3.4 and s=100 to 800 may be estimated through a regression analysis on existing measurement values obtained by using different hyperparameter values in combination with the same sample size. The machine learning apparatus 100 calculates the mean and standard deviation of each estimate as in the foregoing cases. Referring to the example of FIG. 8, the prediction performance at the point of θ=3.4 and s=100 is estimated to have a mean of 0.70 and a standard deviation of 0.03, based on the measurement values at the points of θ=2.1 and s=100, and θ=9.5 and s=100. Also, the prediction performance at the point of θ=3.4 and s=200 is similarly estimated to have a mean of 0.77 and a standard deviation of 0.03. The prediction performance at the point of θ=3.4 and s=400 is estimated to have a mean of 0.82 and a standard deviation of 0.03. The prediction performance at the point of θ=3.4 and s=800 is estimated to have a mean of 0.85 and a standard deviation of 0.03.

Since no learning steps are done as to the hyperparameter θ=3.4, the prediction performance at the points of θ=3.4 and s=1600 to 6400 are estimated through a regression analysis on existing measurement values and estimated values that were obtained by using different hyperparameter values in combination with the same sample size. As to the source data of this estimation, measurement values are used in the case of executed learning steps, and estimated values are used in the case of unexecuted learning steps. In this way, the machine learning apparatus 100 estimates prediction performance in the case of large sample sizes. It is noted here that the regression analysis in the first estimation method uses the means of prediction performance as values of the explanatory variable, without considering standard deviation.

Referring to the example of FIG. 8, the prediction performance at the point of θ=2.1 and s=1600 is estimated to have a mean of 0.88 and a standard deviation of 0.03, based on the measurement value of 0.92 at the point of θ=2.1 and s=1600, as well as on the mean prediction performance of 0.72 estimated with respect to θ=9.5 and s=1600. The prediction performance at the point of θ=3.4 and s=3200 is estimated to have a mean of 0.89 and a standard deviation of 0.03, based on the measurement value of 0.93 at the point of θ=2.1 and s=3200, as well as on the mean prediction performance of 0.89 estimated with respect to θ=3.4 and s=3200. The prediction performance at the point of θ=3.4 and s=6400 is estimated to have a mean of 0.90 and a standard deviation of 0.03, based on the mean prediction performance of 0.94 estimated with respect to θ=2.1 and s=6400, as well as on the mean prediction performance of 0.72 estimated with respect to θ=9.5 and s=6400.

The above-described first estimation method is, however, tends to underestimate the dispersion of prediction performance of unexecuted hyperparameter values. Referring to the example of FIG. 8, the standard deviations indicated at the points of θ=3.4 and s=1600 to 6400 might have been underestimated.

Figure 9:
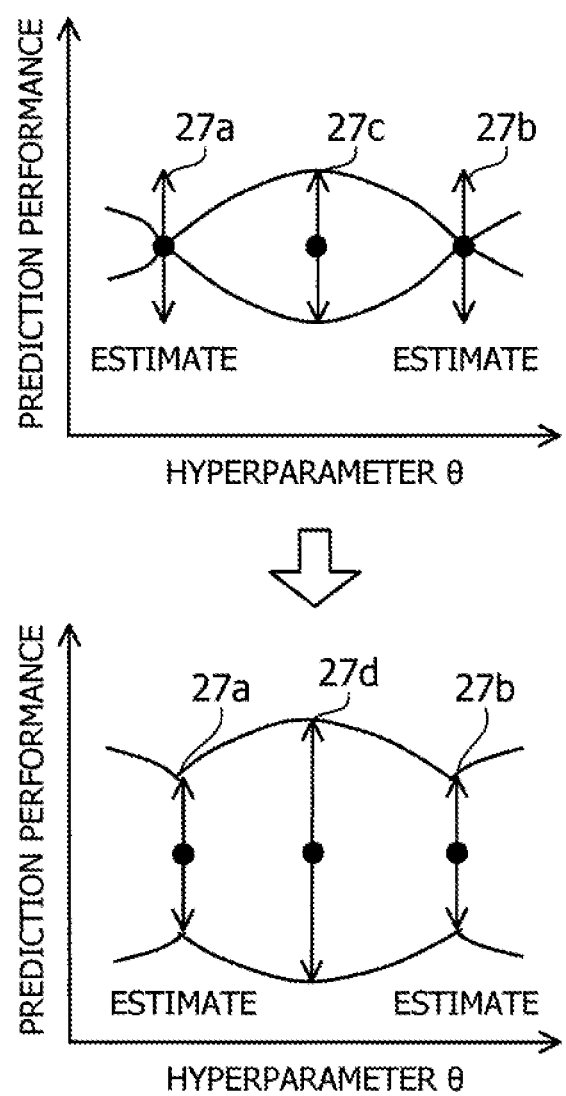
FIG. 9 illustrates a first exemplary estimation of a standard deviation of prediction performance.

FIG. 9 illustrates a first exemplary estimation of a standard deviation of prediction performance. The graphs seen in FIG. 9 include first to third estimates 27a to 27c. The first estimate 27a represents prediction performance at a first hyperparameter value in combination with a specific sample size, which is estimated from measurement values with respect to small sample sizes. The second estimate 27b represents prediction performance at a second hyperparameter value in combination with the specific sample size, which is estimated from measurement values with respect to small sample sizes. The third estimate 27c represents prediction performance at a third hyperparameter value in combination with the specific sample size, which is estimated by performing a regression analysis on the means of the first and second estimates 27a and 27b according to the foregoing first estimation method. Each estimate 27a, 27b, and 27c includes a mean and a standard deviation of prediction performance.

The standard deviation of the third estimate 27c incorporates statistical error in the regression analysis performed on the means of first and second estimates 27a and 27b, but lacks the consideration of standard deviations of those estimates. This means that the third estimate 27c might be given a small standard deviation despite large standard deviations in the first and second estimates 27a and 27b. In other words, the deviation of the third estimate 27c could be underestimated.

The lower half of FIG. 9 gives a graph in the case where the standard deviations of the first and second estimates 27a and 27b are considered. As seen, this graph includes a possible estimate 27d of prediction performance at the third hyperparameter value in combination with the specific sample size. This estimate 27d has an expanded upward distribution below the mean value since there may be an upturn in both the first estimate 27a and second estimate 27b. The estimate 27d also has an expanded downward distribution since there may be a downturn below the mean value in both the first estimate 27a and second estimate 27b. That is, the estimate 27d has a larger standard deviation than the third estimate 27c.

The machine learning apparatus 100 may simply use the third estimate 27c when calculating performance improvement, without executing learning steps with the third hyperparameter value. This could lead to overlooking the possibility that the third hyperparameter value may cause a hike in prediction performance. If the alternative estimate 27d is used instead of the third estimate 27c, the noted possibility will properly be evaluated in the task of performance improvement calculation.

FIG. 10 illustrates an example of a second estimation method for predicting performance. According to the second embodiment, the machine learning apparatus 100 uses the Monte Carlo simulation method to estimate prediction performance. The matrix 28 seen in FIG. 10 depicts a second estimation method for calculation of prediction performance. It is assumed here that the machine learning apparatus 100 has already executed learning steps with several setups, including θ=2.1 in combination with s=100 to 3200 and θ=9.5 in combination with s=100 to 800, as it did in FIG. 8. The other setups (hatched cells in FIG. 10) have not yet undergone learning steps, which include θ=2.1 and s=6400, θ=3.4 and s=100 to 6400, and θ=9.5 and s=1600 to 6400.

The machine learning apparatus 100 performs a regression analysis using measurement values of prediction performance in preference to estimated values. As previously discussed in FIG. 8, the machine learning apparatus 100 estimates prediction performance at θ=2.1 in combination with s=6400, based on the existing measurement values of θ=2.1 and s=100 to 3200. The machine learning apparatus 100 also estimates prediction performance at θ=9.5 in combination with s=1600 to 6400, based on the existing measurement values of θ=9.5 and s=100 to 800. The machine learning apparatus 100 further estimates prediction performance at θ=3.4 in combination with s=100 to 800, based on the existing measurement values of θ=2.1 and s=100 to 800 and the same of θ=9.5 and s=100 to 800.

Upon completion of the regression analysis using measurement values, the machine learning apparatus 100 begins more such analysis, but now with means and standard deviations of the newly calculated estimates of prediction performance. To begin with, the machine learning apparatus 100 randomly extracts sample values of prediction performance at an each individual estimate point, assuming that the prediction performance at that point follows a normal distribution with a specific mean and a specific standard deviation. The machine learning apparatus 100 then executes a regression analysis using the sample values extracted at different points, thus calculating a mean and a standard deviation of prediction performance at a new estimate point. The machine learning apparatus 100 repeats such sampling N times (e.g., 1,000 times or 10,000 times), so that it obtains N results (i.e., N sets of mean and standard deviation) of regression analysis.

The machine learning apparatus 100 combines the above N analysis results into a single estimate of prediction performance at the point of interest, including its mean and standard deviation. For example, the machine learning apparatus 100 averages N mean values of prediction performance to determine the final solution for the mean value in question. Also, the machine learning apparatus 100 adds the variance of N mean values to the mean of N variances of prediction performance and uses the resulting sum as the final solution for the variance in question. As another example, the machine learning apparatus 100 may calculate N histograms (or probability distributions) from the N sets of mean and variance and consolidate the N histograms into a single histogram, thus obtaining the final mean and standard deviation of prediction performance.

In the example of FIG. 10, the machine learning apparatus 100 extracts a sample value of 0.93 from the estimate at the point of θ=2.1 and s=6400. The machine learning apparatus 100 similarly extracts a sample value of 0.73 from (the point of) θ=9.5 and s=1600, a sample value of 0.72 from θ=9.5 and s=3200, and a sample value of 0.71 from θ=9.5 and s=6400. The machine learning apparatus 100 then calculates a mean of 0.885 and a standard deviation of 0.03 of prediction performance at the point of θ=3.4 and s=1600, using a measurement value and one of the above sample values. Also, the machine learning apparatus 100 calculates a mean of 0.89 and a standard deviation of 0.03 of prediction performance at the point of θ=3.4 and s=3200, as well as the same mean and standard deviation of prediction performance at the point of θ=3.4 and s=6400.

Likewise, the machine learning apparatus 100 extracts again a sample value of 0.96 from the estimate at the point of θ=2.1 and s=6400. The machine learning apparatus 100 similarly extracts a sample value of 0.72 from (the point of) θ=9.5 and s=1600, a sample value of 0.72 from θ=9.5 and s=3200, and a sample value of 0.73 from θ=9.5 and s=6400. Then with respect to of θ=3.4 in combination with s=1600, 3200, and 6400, the machine learning apparatus 100 performs a regression analysis in the same way as above, thus calculating their respective means and standard deviations of prediction performance. The machine learning apparatus 100 repeats these things N times and obtains N results of regression analysis.

The machine learning apparatus 100 now consolidates the N results into a single distribution, which serves as the final mean and standard deviation of estimates at the points of s=1600, 3200, and 6400 each in combination with θ=3.4. Referring to the example of FIG. 10, a mean of 0.88 and a standard deviation of 0.032 are obtained at the point of θ=3.4 and s=1600. Also, the machine learning apparatus 100 calculates a mean of 0.892 and a standard deviation of 0.031 at the point of θ=3.4 and s=3200, as well as a mean of 0.903 and a standard deviation of 0.04 at the point of θ=3.4 and s=6400. Compare the final results between FIG. 10 and FIG. 8. The standard deviations in FIG. 10 are greater than their counterparts in FIG. 8.

Figure 11:
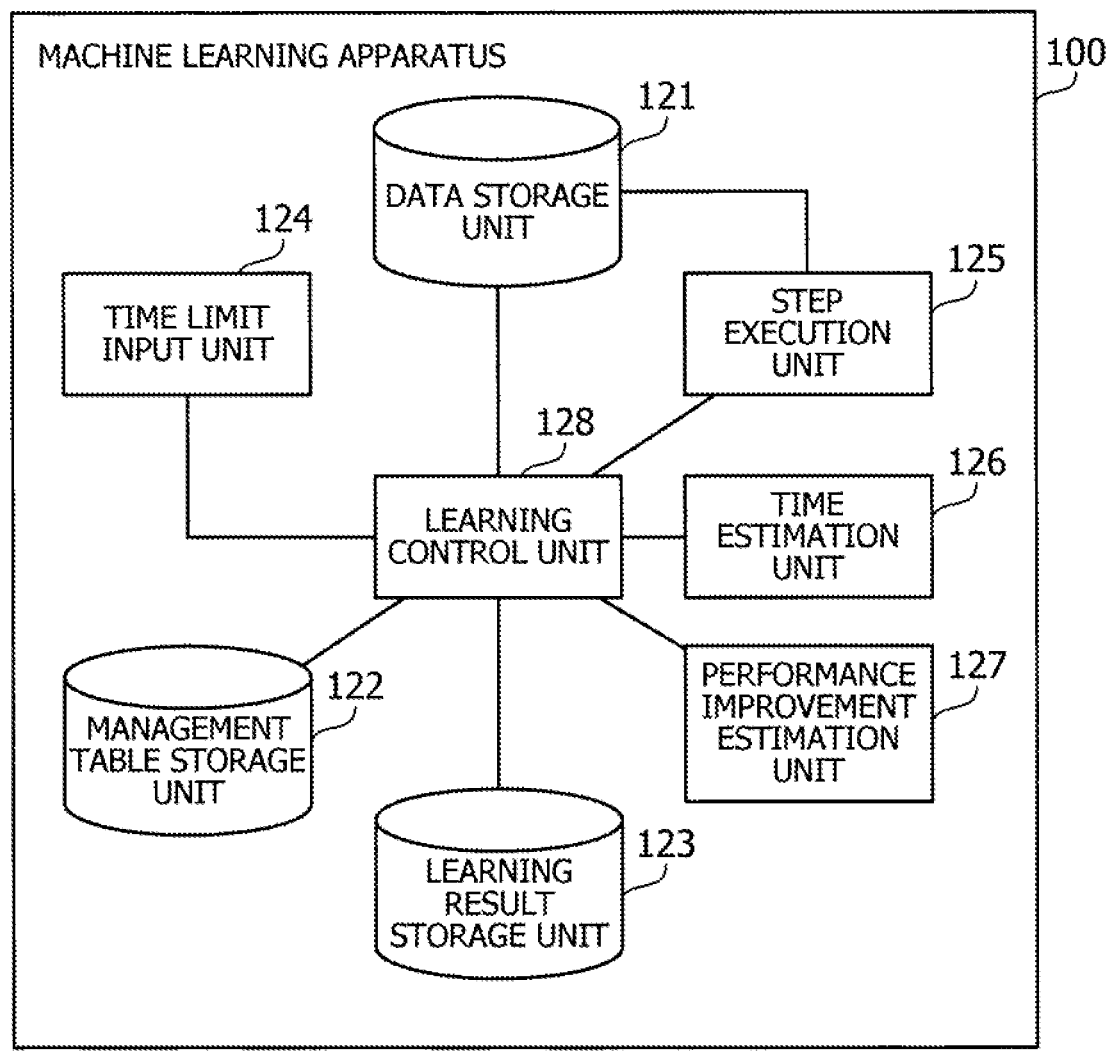
FIG. 11 is a block diagram that illustrates exemplary functions implemented in a machine learning apparatus.

The description now turns to the functions implemented in the machine learning apparatus 100 and explains how they work. FIG. 11 is a block diagram that illustrates exemplary functions implemented in a machine learning apparatus.

The illustrated machine learning apparatus 100 includes a data storage unit 121, a management table storage unit 122, a learning result storage unit 123, a time limit input unit 124, a step execution unit 125, a time estimation unit 126, a performance improvement estimation unit 127, and a learning control unit 128. The data storage unit 121, management table storage unit 122, and learning result storage unit 123 may be implemented as data storage spaces reserved in, for example, the RAM 102 or HDD 103. The time limit input unit 124, step execution unit 125, time estimation unit 126, performance improvement estimation unit 127, and learning control unit 128 may be implemented in the form of, for example, program modules for execution by the CPU 101.

The data storage unit 121 stores a set of data for use in machine learning. This data set is a collection of unit data records each formed from a specific value of a response variable (outcome) and one or more values of explanatory variables (causes). The content of the data storage unit 121 may have been collected from various devices by the machine learning apparatus 100 itself or some other information processing apparatus, or may be entered by the user of the machine learning apparatus 100 or other information processing apparatus.

The management table storage unit 122 is a storage space for several tables used to manage the process of machine learning. During the course of machine learning, the learning control unit 128 updates these tables. Detailed descriptions of the tables will be provided later.

The learning result storage unit 123 is a storage space for machine learning results. A machine learning process outputs a learned model that associates explanatory variables with a response variable. For example, the machine learning process determines the coefficients, or weights, of explanatory variables in a model. The result of machine learning also includes a value indicating prediction performance of the learned model. The result of machine learning further includes information describing a hyperparameter value and a sample size used in learning the model.

The time limit input unit 124 obtains information about a time limit that restricts a machine learning process and provides it to the learning control unit 128. This time limit may be specified from the user via his or her input devices 112. Alternatively, a time limit value may be read out of a setup file stored in the RAM 102 or HDD 103. Another alternative is that some other information processing apparatus sends time limit information to the time limit input unit 124 via the network 114.

The step execution unit 125 executes a machine learning algorithm, changing hyperparameter values for the algorithm as needed. More specifically, the step execution unit 125 receives a specific hyperparameter value and a specific sample size from the learning control unit 128. In response, the step execution unit 125 executes a learning step with the specified combination of a hyperparameter value and a sample size while using data in the data storage unit 121. That is, the step execution unit 125 extracts training data and test data from the data storage unit 121 in accordance with the specified sample size. The step execution unit 125 also applies the specified hyperparameter value to the machine learning algorithm, learns the model with the extracted training data, and measures the model's prediction performance by using the extracted test data.

The step execution unit 125 is able to use various validation methods, such as cross-validation and random-sampling validation, for the purpose of model learning and performance estimation. Which validation method to use may be given as a setup parameter for the step execution unit 125. Yet another function of the step execution unit 125 is to measure the execution time of each learning step. As the final outcome of a learning step, the step execution unit 125 sends the learning control unit 128 a learned model and its prediction performance and execution time.

The time estimation unit 126 receives, from the learning control unit 128, measurement values of execution time, together with their respective combinations of a hyperparameter value and a sample size that have been executed. In response, the time estimation unit 126 estimates the execution time of a learning step with respect to each unexecuted combination of a hyperparameter value and a sample size. In the case of an executed hyperparameter value combined with a new sample size, the time estimation unit 126 estimates an execution time by using measurement values of execution time obtained with smaller sample sizes. This is similar to the foregoing estimation process for prediction performance. In the case of an unexecuted hyperparameter value combined with a specific sample size, the time estimation unit 126 estimates an execution time on the basis of existing values of execution time that have already been measured or estimated with different hyperparameter values in combination with the same sample size. Note that the time estimation unit 126 has only to calculate estimated means (or expected values) of execution time, but not their corresponding standard deviations.

The time estimation unit 126 further converts the calculated execution times into a cumulative execution time, for each unexecuted combination of a hyperparameter value and a sample size. Specifically, the time estimation unit 126 accumulates execution times that are estimated with different sample sizes in combination with a specific hyperparameter value. This operation applies only to unexecuted combinations, and the accumulation begins from the smallest end of sample sizes. The purpose of the conversion is to associate the execution times respectively with performance improvements as in the denominator and numerator of a fraction that represents an improvement speed. The time estimation unit 126 outputs the estimated cumulative execution time to the learning control unit 128.

The performance improvement estimation unit 127 receives, from learning control unit 128, measurement values of prediction performance with respect to executed combinations of a hyperparameter value and a sample size. In response, the performance improvement estimation unit 127 estimates prediction performance with respect to each unexecuted combination of a hyperparameter value and a sample size. In the case of an executed hyperparameter value combined with a new sample size, the performance improvement estimation unit 127 estimates a mean and a standard deviation of prediction performance by using measurement values of prediction performance obtained with smaller sample sizes. In the case of an unexecuted hyperparameter value combined with a specific sample size, the performance improvement estimation unit 127 estimates a mean and a standard deviation of prediction performance by using some existing values of prediction performance that have been measured or estimated with different hyperparameter values in combination with the same sample size.

The performance improvement estimation unit 127 then converts the calculated estimates to performance improvements, with respect to individual unexecuted combinations of a hyperparameter value and a sample size. The term "performance improvement" denotes a difference between a certain indicator value (e.g., UCB) determined from the mean and standard deviation of prediction performance and the achieved prediction performance at present. The performance improvement is assumed to be zero when the indicator value (UCB) is smaller than the achieved prediction performance. The performance improvement estimation unit 127 outputs the estimated performance improvements to the learning control unit 128.

The learning control unit 128 controls a machine learning process using different hyperparameter values. Each time a single learning step is to run, the learning control unit 128 extracts a subset of hyperparameters from a given space of hyperparameter values that are applicable to the machine learning algorithm in use. This subset is supposed to include unexecuted hyperparameter values. When there are executed hyperparameter values, the extracted subset is supposed to include at least some of them.

The learning control unit 128 causes the time estimation unit 126 to estimate cumulative execution times, as well as the performance improvement estimation unit 127 to estimate performance improvements, with respect to the hyperparameter values belonging to the extracted subset. Based on these cumulative execution times and performance improvements, the learning control unit 128 calculates an improvement speed of prediction performance, with respect to each hyperparameter value belonging to the extracted subset. The learning control unit 128 then selects a hyperparameter value that exhibits the highest improvement speed and determines the smallest unexecuted sample size for combination with the selected hyperparameter value. The learning control unit 128 passes the selected hyperparameter value and sample size to the step execution unit 125, thus initiating a learning step.

The learning control unit 128 repeats the sequence of extracting a subset of hyperparameter values, updating the improvement speed, and selecting a hyperparameter value, until the improvement speed becomes sufficiently slow or the cumulative learning time reaches a specific time limit. While many models are produced in the course of machine learning, the learning control unit 128 finds one model with the highest prediction performance and keeps that model in the learning result storage unit 123. The learning control unit 128 also uses the learning result storage unit 123 to keep the measured prediction performance, as well as the hyperparameter value and sample size used in constructing the model.

FIG. 12 illustrates an example of a learning result table. The illustrated learning result table 131 in FIG. 12 is stored in the management table storage unit 122. This learning result table 131 contains the values of prediction performance "$\mu$" and execution time "u" corresponding to each different combination of a hyperparameter value and a sample size. The prediction performance $\mu$ is a measurement value of prediction performance, and the execution time u is a measurement value of execution time of a learning step. Both are measured by the step execution unit 125.

Referring to FIG. 12, the symbol represents prediction performance corresponding to the combination of i-th hyperparameter value and j-th sample size, and the symbol $u_{i,j}$ represents an execution time corresponding the same combination. Index i varies in the range of 1, 2, 3, 4, and 5, respectively corresponding to $\theta$=2.1, 3.4, 5.2, 7.6, and 9.5. Index j varies in the range of 1, 2, 3, 4, 5, 6, and 7, respectively corresponding to s=100, 200, 400, 800, 1600, 3200, and 6400.

FIG. 13 illustrates an example of an intermediate estimation table. This intermediate estimation table 132 is for use by the time estimation unit 126 and performance improvement estimation unit 127. The intermediate estimation table 132 may be stored in the management table storage unit 122. The intermediate estimation table 132 contains the values of mean $\mu$ of prediction performance, standard deviation $\sigma$ of the same, and execution time u, corresponding to different combinations of a hyperparameter value and a sample size. The mean $\mu$ and standard deviation $\sigma$ in the intermediate estimation table 132 describe a distribution of prediction performance estimated by the performance improvement estimation unit 127. The execution time u indicates the execution time of a learning step which has been estimated by the time estimation unit 126.

Referring to FIG. 13, the symbol $\mu_{i,j}$ represents a mean prediction performance corresponding to the combination of i-th hyperparameter value and j-th sample size, and the symbol $\sigma_{i,j}$ represents a standard deviation of prediction performance corresponding to the same combination. The symbol $u_{i,j}$ represents an execution time corresponding to the combination of i-th hyperparameter value and j-th sample size.

FIG. 14 illustrates an example of an estimation table. This estimation table 133 is stored in the management table storage unit 122. The estimation table 133 contains the values of performance improvement "g" and cumulative execution time "t," corresponding to different combinations of a hyperparameter value and a sample size. The estimation table 133 also contains the values of improvement speed v in relation to different hyperparameter values.

The values of performance improvement g in the estimation table 133 are what the performance improvement estimation unit 127 has calculated on the basis of the foregoing intermediate estimation table 132. The values of cumulative execution time t in the same are what the time estimation unit 126 has calculated on the basis of the foregoing intermediate estimation table 132. The values of improvement speed v are what the learning control unit 128 has calculated. Referring to FIG. 14, the symbol $g_{i,j}$ represents a performance improvement corresponding to the combination of i-th hyperparameter value and j-th sample size, and the symbol $t_{i,j}$ represents a cumulative execution time corresponding to the same combination. The symbol $v_i$ represents an improvement speed corresponding to the i-th hyperparameter value.

Figure 15:
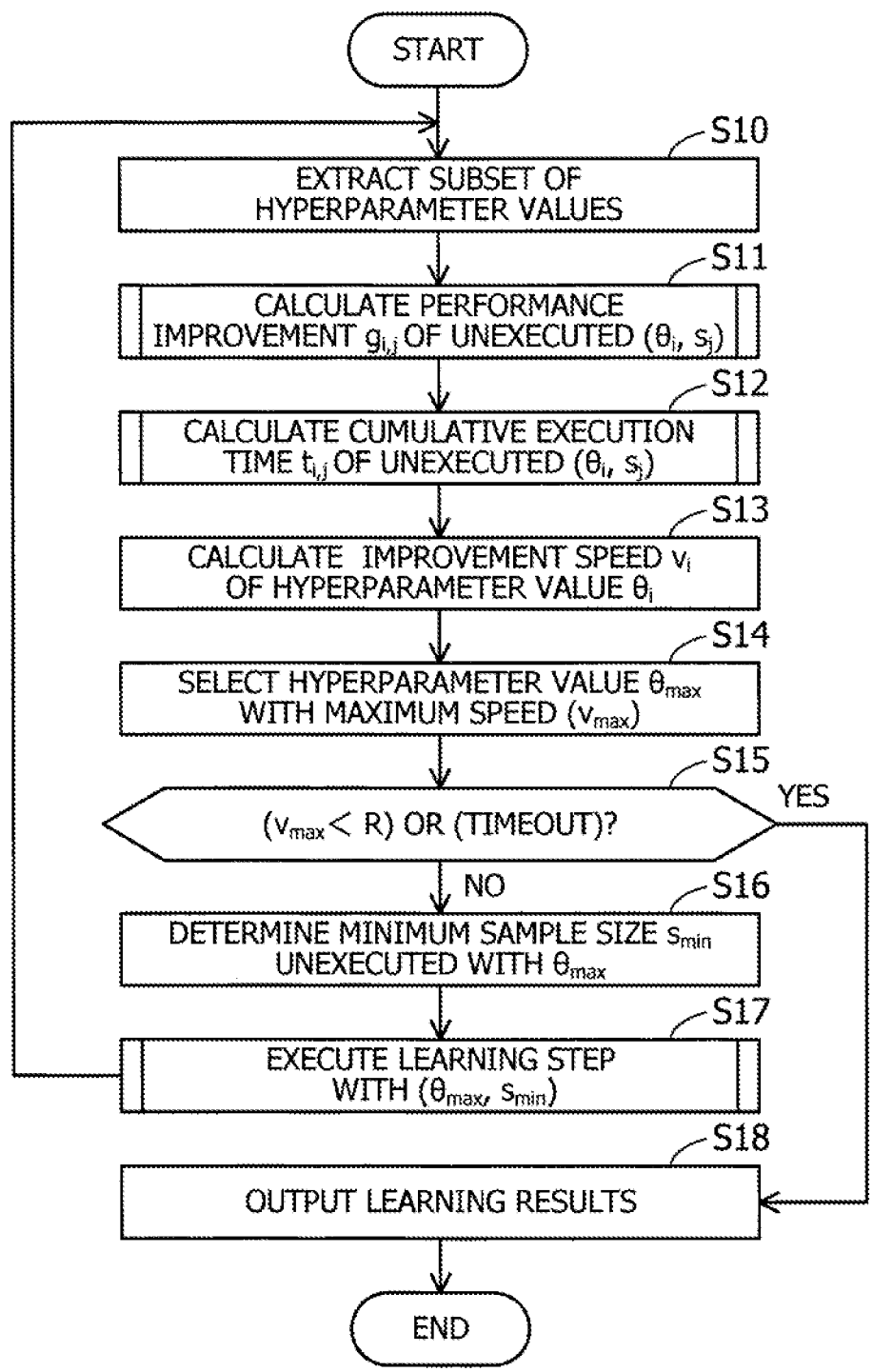
FIG. 15 is a flowchart that illustrates a first exemplary procedure of machine learning.

FIG. 15 is a flowchart that illustrates a first exemplary procedure of machine learning.

(S10) The learning control unit 128 extracts a subset of hyperparameter values from a given space of hyperparameter values that are applicable to the machine learning algorithm in use.

In this step, the learning control unit 128 randomly picks up a certain number (e.g., 30) of unexecuted hyperparameter values, thus enrolling them as members of the noted subset. When some hyperparameter values have already been executed, the learning control unit 128 includes at least some of those values in the subset. As an example, the learning control unit 128 may include all executed hyperparameter values in the subset. Another example is to randomly extract a certain number (e.g., 30) of executed hyperparameter values and populate the subset with them. Yet another example is that the learning control unit 128 sorts the executed hyperparameter values in descending order of previously calculated improvement speed and then selects a certain number of hyperparameter values from the topmost group.

(S11) The performance improvement estimation unit 127 calculates a performance improvement $g_{i,j}$ with respect to each unexecuted combination ($\theta_i$, $s_j$) of a hyperparameter value and a sample size, where the hyperparameter $\theta_i$ belongs to the subset extracted in step S10. The procedure of this performance improvement estimation will be described in detail later.

(S12) The time estimation unit 126 calculates a cumulative execution time $t_{i,j}$ of each unexecuted combination ($\theta_i$, $s_j$) of hyperparameter value and sample size, where the hyperparameter $\theta_i$ belongs to the subset extracted in step S10. The procedure of this time estimation will be described in detail later.

(S13) Based on the performance improvement $g_{i,j}$ calculated in step S11 and the cumulative execution time $t_{i,j}$ calculated in step S12, the learning control unit 128 calculates an improvement speed $v_i$ with respect to each hyperparameter in the subset extracted in step S10.

For example, the learning control unit 128 calculates $g_{i,j}/t_{i,j}$ for each unexecuted combination ($\theta_i$, $s_j$). With respect to an individual hyperparameter value in the subset, the learning control unit 128 finds $g_{i,j}/t_{i,j}$ whose sample size is the smallest of all those greater than a certain threshold R, and selects that value of $g_{i,j}/t_{i,j}$ as the improvement speed $v_i$ of that hyperparameter value. The threshold R may have a value of 0.001/3600, for instance. As another example, the learning control unit 128 calculates $g_{i,M}/t_{i,M}$ for a hyperparameter value in the subset, in combination with the largest sample size $s_M$. The learning control unit 128 then selects this $g_{i,M}/t_{i,M}$ as the improvement speed $v_i$ of that hyperparameter value.

(S14) Out of the subset extracted in step S10, the learning control unit 128 selects a hyperparameter value that has exhibited the highest improvement speed in step S13. Now let $v_{max}$ denote the highest improvement speed, and $\theta_{max}$ denote the hyperparameter value that exhibits $v_{max}$.

(S15) The learning control unit 128 determines whether the improvement speed $v_{max}$ obtained in step S14 is smaller than the threshold R. The learning control unit 128 also keeps track of the time elapsed since the start of the first learning step and determines whether the machine learning process has exceeded its time limit. When either condition is met, the process skips to step S18. When neither of the two conditions is met, the process advances to step S16.

(S16) With reference to the learning result table 131, the learning control unit 128 determines the smallest sample size that has not yet been executed in combination with the largest hyperparameter value $\theta_{max}$. This smallest sample size is represented by the symbol $s_{min}$.

(S17) The step execution unit 125 executes a learning step with the hyperparameter value $\theta_{max}$ selected in step S14 and the sample size $s_{min}$ determined in step S16. The detailed procedure of this step execution will be described later. The process then goes back to step S10.

(S18) The learning control unit 128 terminates the present machine learning process after storing final results into the learning result storage unit 123. More specifically, the final results include a model with the highest prediction performance of all the models calculated. Also included are the information about the final model's prediction performance, the hyperparameter value used in the machine learning of that model, and the sample size used in the same.

Figure 16:
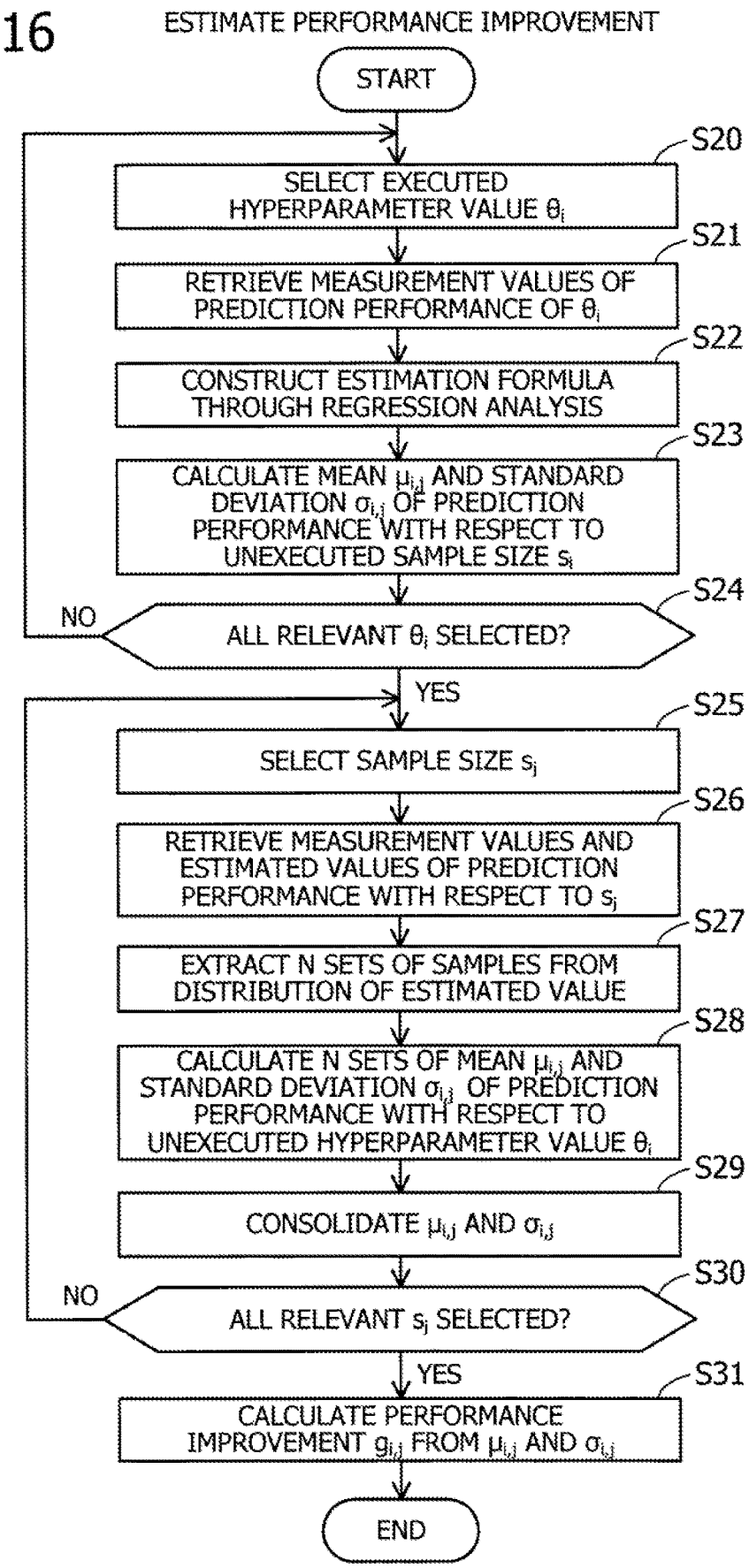
FIG. 16 is a flowchart that illustrates a first exemplary procedure of estimating performance improvements.

FIG. 16 is a flowchart that illustrates a first exemplary procedure of estimating performance improvements.

(S20) The performance improvement estimation unit 127 receives a learning result table 131 from the learning control unit 128. The performance improvement estimation unit 127 looks into this learning result table 131 and selects one hyperparameter value $\theta_i$ from among those that have been executed. Note that steps S20 to S24 are skipped when no executed hyperparameter value is found.

(S21) The performance improvement estimation unit 127 retrieves measurement values of prediction performance from the learning result table 131, with reference to the table entries relating to the selected hyperparameter value $\theta_i$.

(S22) The performance improvement estimation unit 127 performs a regression analysis using the measurement values retrieved in step S21, thus constructing an estimation formula for estimating prediction performance from sample sizes. For example, this estimation formula may take the form of $\mu = \beta_1 - \alpha_1 \times s^{-\gamma_1}$, and the performance improvement estimation unit 127 conducts a nonlinear regression analysis to determine the coefficients $\alpha_1$, $\beta_1$, and $\gamma_1$.

(S23) The performance improvement estimation unit 127 determines one or more unexecuted sample sizes $s_j$ for combination with the hyperparameter value $\theta_i$. Based on the estimation formula and probability distribution obtained in step S22, the performance improvement estimation unit 127 calculates the mean $\mu_{i,j}$ and standard deviation $\sigma_{i,j}$ of prediction performance corresponding to the combination of hyperparameter value $\theta_i$ and unexecuted sample size $s_j$. The performance improvement estimation unit 127 registers $\mu_{i,j}$ and $\sigma_{i,j}$ in an intermediate estimation table 132.

(S24) The performance improvement estimation unit 127 determines whether the above step S20 has selected all the relevant (i.e., executed) hyperparameter values. When all are done, the process advances to step S25. When there is a pending hyperparameter value, the process returns to step S20.

(S25) The performance improvement estimation unit 127 selects a sample size $s_j$. For example, the sample size may take the values in a geometric series, as in 100, 200, 400, 800, 1600, 3200, 6400, 12800, and so on. While the common ratio of this geometric series is set to two in the second embodiment, any other ratio (e.g., four) may work as well. Note that steps S25 to S30 are skipped when there are no unexecuted hyperparameter values.

(S26) The performance improvement estimation unit 127 retrieves measurement values of prediction performance from the learning result table 131, with reference to the table entries relating to the selected sample size $s_j$. The performance improvement estimation unit 127 also makes access to the intermediate estimation table 132 updated in step S23, thus obtaining the values of mean $\mu$ and standard deviation $\sigma$ of prediction performance estimated with the selected sample size $s_j$.

(S27) There may be one or more hyperparameter values $\theta_i$ that have been executed in combination with the sample size $s_j$ selected in step S25. The performance improvement estimation unit 127 extracts N sets of sample values for each combination $(\theta_i, s_j)$ of hyperparameter value $\theta_i$ and sample size $s_j$. In the case where a learning step has been executed with $(\theta_i, s_j)$, the performance improvement estimation unit 127 uses its measurement values for N samples. In the case where no learning step has been executed with $(\theta_i, s_j)$, the performance improvement estimation unit 127 extracts N sample values according to the probability distribution given by the mean $\mu_{i,j}$ and standard deviation $\sigma_{i,j}$.

(S28) With the sample values extracted in step S27, the performance improvement estimation unit 127 conducts regression analysis N times, thus yielding N estimation formulas for the purpose of estimating prediction performance from hyperparameter values. The performance improvement estimation unit 127 calculates N means $\mu_{i,j}$ and N standard deviations $\sigma_{i,j}$ of prediction performance using the N estimation formulas, with respect to the combination of unexecuted hyperparameter value $\theta_i$ and sample size $s_j$ selected in step S25.

(S29) The performance improvement estimation unit 127 consolidates the N means $\mu_{i,j}$ and N standard deviations $\sigma_{i,j}$ calculated in step S28 into a final mean and a final standard deviation of prediction performance, with respect to the combination of unexecuted hyperparameter value $\theta_i$ and sample size $s_j$ selected in step S25. The performance improvement estimation unit 127 then populates the intermediate estimation table 132 with the finalized mean and standard deviation. For example, the performance improvement estimation unit 127 calculates a final mean by averaging the N pieces of $\mu_{i,j}$. The performance improvement estimation unit 127 also calculates a final variance by adding the mean of N pieces of variances $\sigma^2_{i,j}$ (i.e., the square of standard deviation) to the variance of N pieces of $\mu_{i,j}$. Another example is to create an integrated histogram by adding up N histograms each expressed by a combination of $\mu_{i,j}$ and $\sigma_{i,j}$ and calculate the mean and standard deviation of the integrated histogram.

(S30) The performance improvement estimation unit 127 determines whether step S25 has selected all sample sizes. When all are done, the process advances to step S31. When there is a pending sample size, the process returns to step S25.

(S31) The performance improvement estimation unit 127 reads the intermediate estimation table 132 to obtain a mean $\mu_{i,j}$ and a standard deviation $\sigma_{i,j}$ and calculates a performance improvement $g_{i,j}$ based on them, with respect to of each unexecuted combination $(\theta_i, s_j)$. For example, the performance improvement estimation unit 127 calculates a 95% prediction interval of estimated values on the basis of $\mu_{i,j}$ and $\sigma_{i,j}$ and determines its upper boundary, UCB. Each performance improvement $g_{i,j}$ is obtained as a difference between UCB and the achieved prediction performance, where the former is the minuend and the latter is the subtrahend. The performance improvement is assumed to be zero when the UCB is smaller than the achieved prediction performance. The performance improvement estimation unit 127 informs the learning control unit 128 of performance improvements $g_{i,j}$. The learning control unit 128 populates the estimation table 133 with the received performance improvements $g_{i,j}$.

Figure 17:
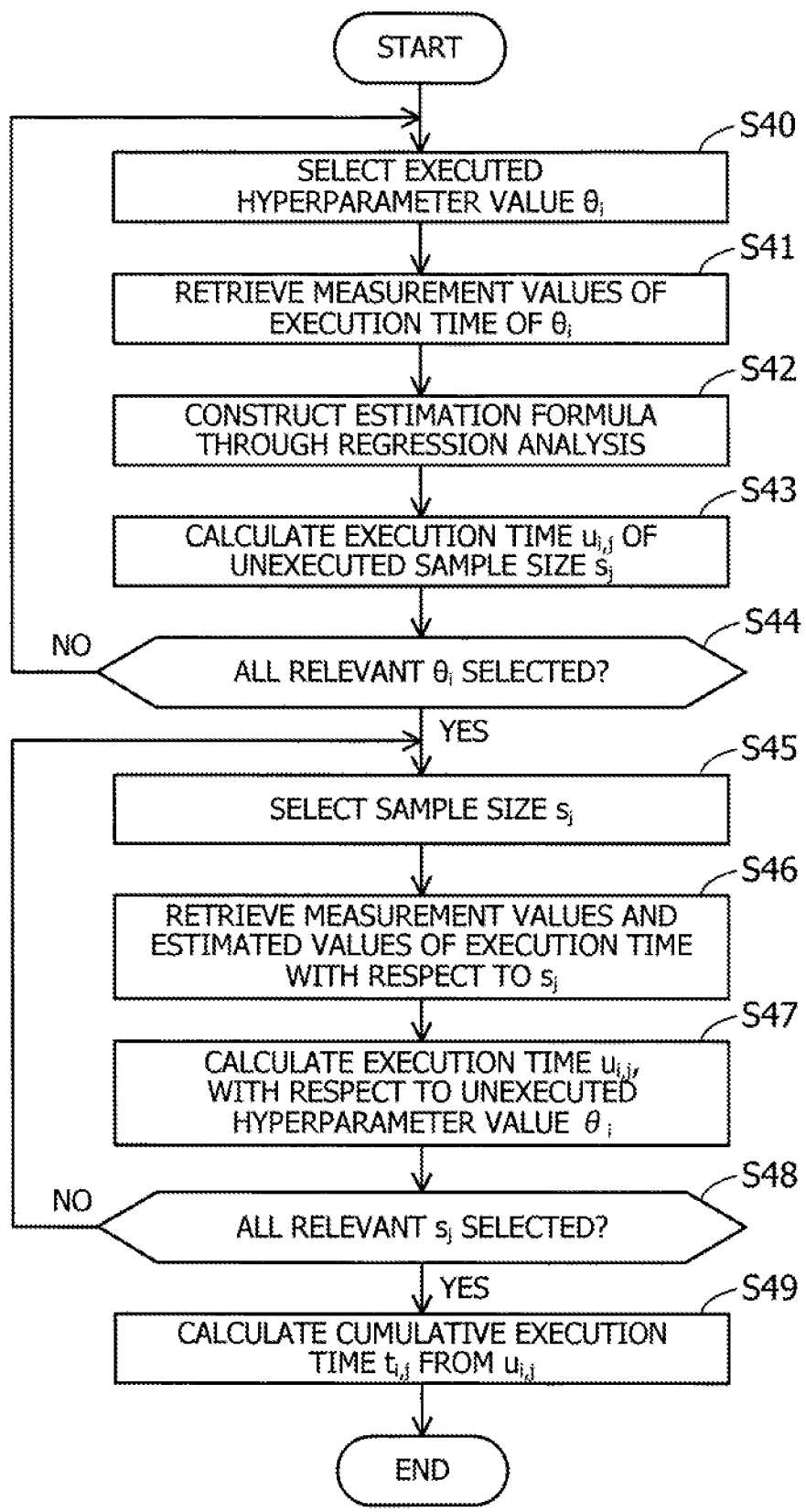
FIG. 17 is a flowchart that illustrates an exemplary procedure of time estimation.

FIG. 17 is a flowchart that illustrates an exemplary procedure of time estimation.

(S40) The time estimation unit 126 receives a learning result table 131 from the learning control unit 128. In response, the time estimation unit 126 looks into the learning result table 131 and selects an executed hyperparameter value $\theta_i$. Note that steps S40 to S44 are skipped when no such executed hyperparameter values are found.

(S41) With reference to the learning result table 131, the time estimation unit 126 retrieves measurement values of execution time with respect to the selected hyperparameter value $\theta_i$.

(S42) Using the measurement values obtained in step S41, the time estimation unit 126 performs a regression analysis and constructs an estimation formula for estimating execution time u from sample size s. The estimation formula may take the form of, for example, $u=\beta_2+\alpha_2 \times s$, and the time estimation unit 126 performs a linear regression analysis to determine the coefficients $\alpha_2$ and $\beta_2$.

(S43) The time estimation unit 126 determines one or more unexecuted sample sizes $s_j$ for combination with the above hyperparameter value $\theta_i$. Based on the estimation formula of step S42, the time estimation unit 126 calculates an execution time $u_{i,j}$ corresponding to the combination of hyperparameter value $\theta_i$ and unexecuted sample size $s_j$. This estimation has only to calculate a mean execution time (i.e., expected value); there is no need to calculate standard deviations. The time estimation unit 126 registers $u_{i,j}$ in the intermediate estimation table 132.

(S44) The time estimation unit 126 determines whether the above step S40 has selected all the relevant (i.e., executed) hyperparameter values. When all are done, the process advances to step S45. When there is a pending hyperparameter value, the process returns to step S40.

(S45) The time estimation unit 126 selects a sample size $s_j$. Note that the process skips steps S45 to S48 when there are no unexecuted hyperparameter values.

(S46) With reference to the learning result table 131, the time estimation unit 126 retrieves measurement values of execution time with respect to the selected sample size $s_j$. The time estimation unit 126 also makes access to the intermediate estimation table 132 to obtain estimated values of execution time with respect to the selected sample size $s_j$.

(S47) The time estimation unit 126 performs a regression analysis of execution time using the measurement values and estimated values obtained in step S46, thus constructing an estimation formula for estimating execution time from hyperparameter values. Using the estimation formula, the time estimation unit 126 calculates an execution time $u_{i,j}$ corresponding to the combination of an unexecuted hyperparameter value $\theta_i$ and the sample size $s_j$ of step S45.

(S48) The time estimation unit 126 determines whether the above step S45 has selected all sample sizes. When all are done, the process advances to step S49. When there is a pending sample size, the process returns to step S45.

(S49) The time estimation unit 126 reads the intermediate estimation table 132 to obtain an execution time $u_{i,j}$ of an unexecuted combination $(\theta_i, s_j)$ and calculates a cumulative execution time $t_{i,j}$. Cumulative execution time $t_{i,j}$ is a sum of execution times $u_{i,j}$ of the learning steps whose hyperparameter value is $\theta_i$ and whose sample size is $s_j$ or below, where executed sample sizes are excluded from this step. This cumulative execution time $t_{i,j}$ denotes the estimated time from the present to the end of a learning step of $(\theta_i, s_j)$, assuming that the machine learning apparatus 100 continuously executes learning steps only with the hyperparameter value $\theta_i$. The time estimation unit 126 supplies such estimated cumulative execution times $t_{i,j}$ to the learning control unit 128. The learning control unit 128 populates the estimation table 133 with the received cumulative execution times $t_{i,j}$.

Figure 18:
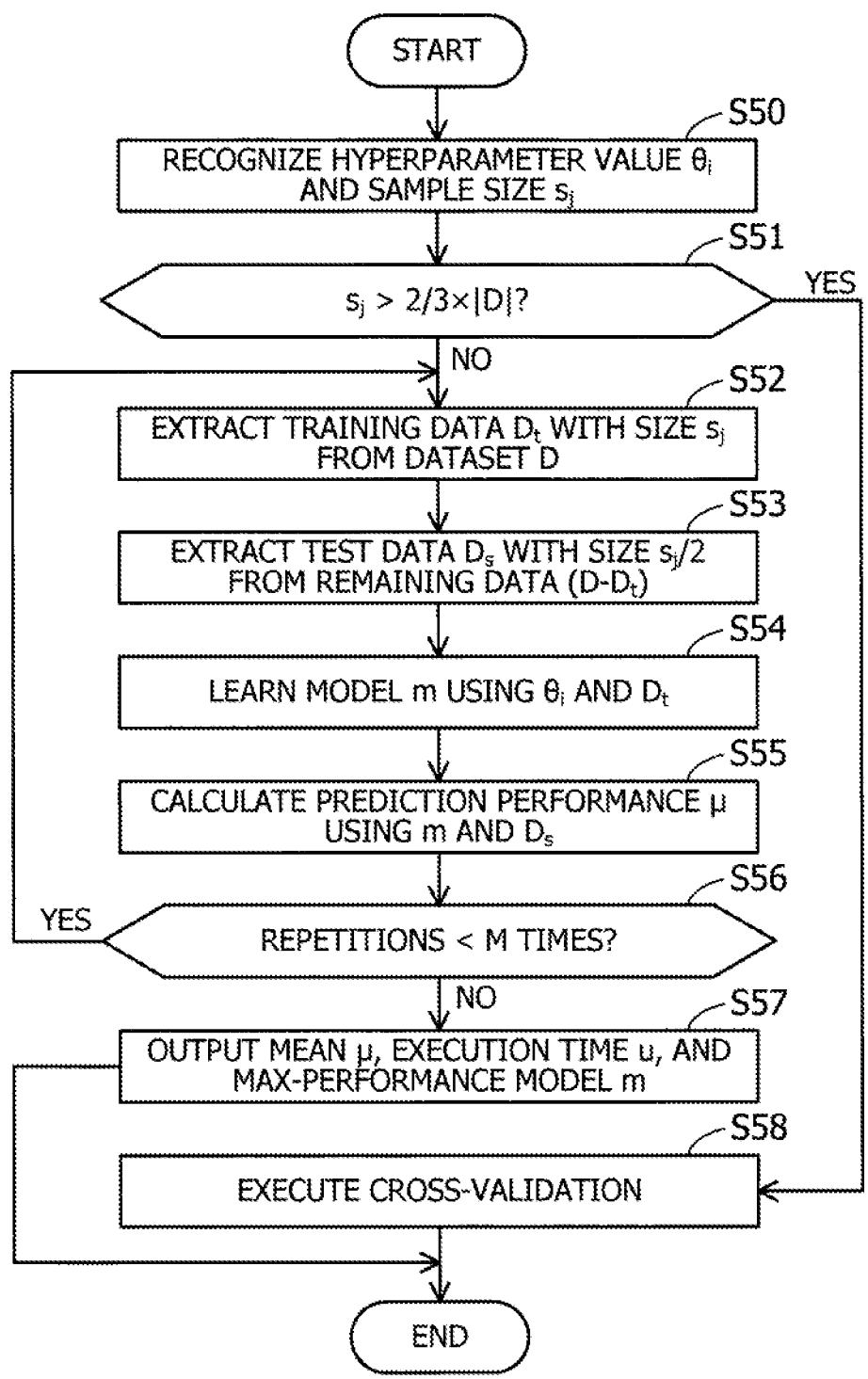
FIG. 18 is a flowchart that illustrates an exemplary procedure of step execution.

FIG. 18 is a flowchart that illustrates an exemplary procedure of step execution. It is assumed here that the step execution unit 125 is configured to switch between a random-sampling validation method or a cross-validation method, depending on the size of a dataset D. It is not intended, however, to limit the step execution unit 125 to this implementation. Other validation methods may also be used.

(S50) The step execution unit 125 recognizes a specific hyperparameter value $\theta_i$ and a specific sample size $s_j$ specified by the learning control unit 128. The step execution unit 125 also recognizes a dataset D in the data storage unit 121.

(S51) The step execution unit 125 determines whether the sample size $s_j$ is greater than two thirds of the dataset D. When $s_j$ is greater than two thirds of |D|, the step execution unit 125 chooses cross-validation because the amount of data is insufficient. The process then moves to step S58. When the sample size $s_j$ is equal to or smaller than two thirds of |D|, the step execution unit 125 chooses random-sampling validation because of the presence of sufficient amounts of data. The process thus advances to step S52.

(S52) The step execution unit 125 randomly extracts training data $D_t$ with the specified sample size $s_j$ from the available dataset D. This extraction of training data is a non-duplicative sampling process, meaning that the resulting training data is formed from $s_j$ different units of data.

(S53) The step execution unit 125 randomly extracts test data $D_s$, with half the specified sample size $s_j$, from the remaining portion of the dataset D. This extraction of test data is a non-duplicative sampling process, meaning that the resulting test data is formed from $s_j/2$ different units of data, exclusive of training data $D_t$ extracted above. Here the ratio between training data $D_t$ and test data $D_s$ is 2:1 although it is not intended to limit the embodiments by this specific implementation.

(S54) The step execution unit 125 learns a model m using the specified hyperparameter value $\theta_i$ and the training data $D_t$ extracted in step S52.

(S55) The step execution unit 125 calculates a prediction performance $\mu$ of the learned model m, using the test data $D_s$ extracted above in step S53. The prediction performance $\mu$ may be represented in terms of accuracy, precision, RMSE, or any other indicator.

(S56) The step execution unit 125 keeps track of the execution count of steps S52 to S55, in comparison with a threshold M (e.g., 10). The threshold M may be given as a setup parameter for the step execution unit 125. When the current execution count is smaller than M, the process returns to step S52 to make another round of steps S52 to S55. Otherwise, the process advances to step S57.

(S57) The step execution unit 125 calculates a mean of the M values of prediction performance $\mu$ that step S55 has yielded. This mean is referred to as a measurement value of prediction performance. The step execution unit 125 also calculates an execution time u from the beginning of step S50 to the end of repetition of steps S52 to S56. This execution time is also a measurement value. The step execution unit 125 further outputs a model that delivers the highest prediction performance among the M models m learned in step S54. This marks the end of a single learning step with a random-sampling validation method.

(S58) The step execution unit 125 executes the aforementioned cross-validation, instead of the random-sampling validation discussed above. For example, the step execution unit 125 randomly extracts sample data with a size of $s_j$ from the given dataset D and subdivides the extracted sample data evenly into M blocks. M−1 blocks are used as training data, and one block is used as test data. The step execution unit 125 repeats these things M times, while changing test data blocks. The step execution unit 125 outputs the mean of M prediction performance values, execution time, and the highest-performance model.

According to the second embodiment described above, the proposed machine learning apparatus 100 estimates an improvement speed of prediction performance each time a learning step is executed, with respect to individual hyperparameter values. The machine learning apparatus 100 determines which hyperparameter value provides the highest improvement speed, and selects that value in the next learning step. This preferential selection of hyperparameter values improves the prediction performance of models more efficiently. Other hyperparameter values would not be able to deliver a performance improvement. The machine learning apparatus 100 does not use such values at all or may only use them in combination with small sample sizes. The second embodiment therefore reduces the machine learning time as a whole.

In addition to the above, the preferential use of fast-improving hyperparameter values ensures the quality of models even if the time frame for machine learning is limited. That is, no matter when the machine learning may be quitted, the model at that point is supposed to be the then best solution. Also, the proposed method would not eliminate the chance of execution of a hyperparameter value as long as it is somewhat capable of improving prediction performance, although the execution may be deferred. This feature reduces the risk of mistakenly discarding capable hyperparameter values while the sample size is small. The proposed method thus improves the model's prediction performance more efficiently by using a number of hyperparameter values.

Some hyperparameter values may be executed together with small sample sizes. Prediction performance and execution time of those hyperparameter values are estimated with a larger sample size on the basis of relationships between different sample sizes. Some other hyperparameter values may be left unexecuted. Prediction performance and execution time of those unexecuted hyperparameter values are estimated on the basis of relationships between different hyperparameter values, using measurement values or estimated values corresponding to other hyperparameter values. In this way, the proposed method estimates the prediction performance of models with various combinations of hyperparameter value and sample size, so as to make an efficient search for potentially capable parameter values.

As noted above, the proposed method may estimate prediction performance of a hyperparameter value by using existing estimates of prediction performance corresponding to other hyperparameter values. When this is the case, the proposed method considers not only their means, but also their standard deviations, so that the standard deviation of prediction performance of an unexecuted hyperparameter value would not become too small. In other words, the proposed method prevents the potential prediction performance of a hyperparameter from being underestimated.

(c) Third Embodiment

This section of the description is directed to a third embodiment. The second and third embodiments share some common elements (for which see the preceding part of the description). The following description will focus on the distinctive points of the third embodiment.

The third embodiment is different from the second embodiment in its method of estimating prediction performance with respect to unexecuted hyperparameter values. The third embodiment is implemented in a machine learning apparatus with the same hardware configuration discussed in FIG. 2. Functions of this machine learning apparatus are implemented as like software modules discussed in FIG. 11. The following description will now explain a machine learning apparatus of the third embodiment, using the same reference numerals for like elements as used in FIGS. 2 and 11.

Figure 19:
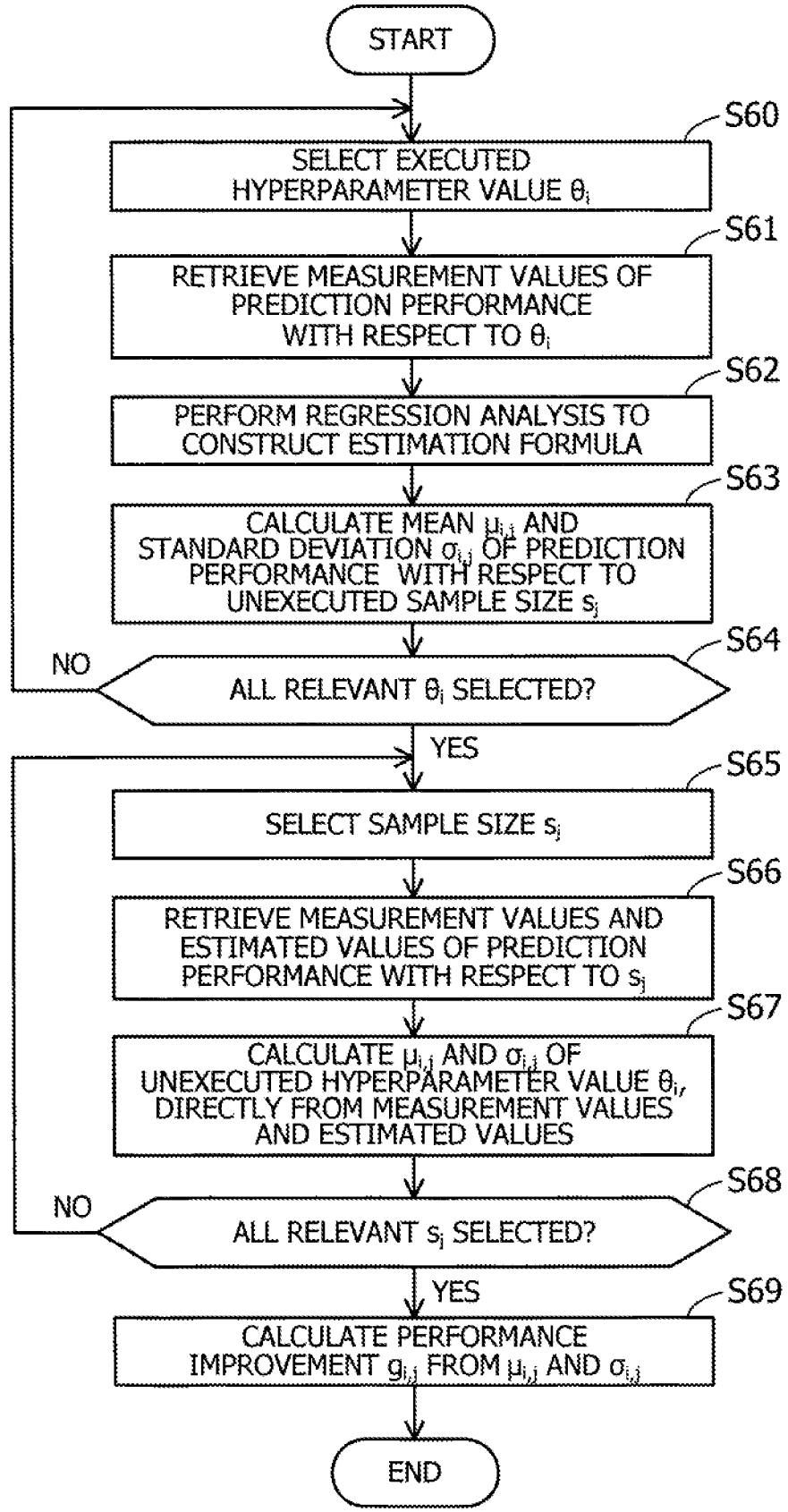
FIG. 19 is a flowchart that illustrates a second exemplary procedure of estimating performance improvements.

FIG. 19 is a flowchart that illustrates a second exemplary procedure of estimating performance improvements. The flowchart of FIG. 19 includes ten steps S60 to S69, of which steps S60 to S66, S68, and S69 are similar to steps S20 to S26, S30, and S31 in FIG. 16. The foregoing steps S27 to S29 of FIG. 16 execute a Monte Carlo simulation to estimate prediction performance of $(\theta_i, s_j)$ in terms of mean $\mu$ and standard deviation $\sigma$. In contrast, step S67 of FIG. 19 calculates the same mean $\mu$ and standard deviation $\sigma$ directly by using several formulas based on measurement values and estimated values of prediction performance of different hyperparameter values in combination with the same sample size.

The description will now explain what formulas are actually used to calculate a mean $\mu$ and a standard deviation $\sigma$ of prediction performance. The symbols $\mu(\theta, s)$ and $\sigma(\theta, s)$ may be used in the following description to express respectively the mean and standard deviation of prediction performance corresponding to the combination of hyperparameter value $\theta$ and sample size s.

It is assumed that one hyperparameter value remains unexecuted, whereas n hyperparameter values $(\theta=\theta_1, \theta_2, \ldots, \theta_n)$ have been executed with a small sample size. The n hyperparameter values, together with a larger sample size s, have also been subjected to the estimation process for prediction performance, and the estimated values are available. Suppose now that those estimated values are to be used to estimate the prediction performance with respect to the noted unexecuted hyperparameter value. This estimation process uses a Gaussian process in place of the simulation.

Note that measurement values may replace estimated values, with respect to some of the n hyperparameter values. When this is the case, the following calculation may be modified such that a measurement value is used as the mean of prediction performance, assuming that the standard deviation is zero.

When a hyperparameter value $\theta$ and a sample size s are given, equation (1) calculates the mean $\mu(\theta, s)$ of prediction performance by using column vector $\kappa(\theta)$, matrix K, and column vector $\mu(s)$. Equation (2) calculates the variance $\sigma^2(\theta, s)$ of prediction performance by using variance $\sigma^2_G(\theta, s)$, row vector $h^2(\theta)$, and column vector $\sigma^2(s)$. The variance term $\sigma^2_G(\theta, s)$ may be expanded as seen in equation (2), using kernel function $k(\cdot, \cdot)$, column vector $\kappa(\theta)$, and matrix K.

$$\mu(\theta, s) = \kappa(\theta)^T K^{-1} \mu(s) \qquad (1)$$

$$\sigma^2(\theta, s) = \sigma^2_G(\theta, s) + h^2(\theta)\sigma^2(s) \qquad (2)$$
$$= \{k(\theta, \theta) - \kappa(\theta)^T K^{-1} \kappa(\theta)\} + h^2(\theta)\sigma^2(s)$$

Column vector $\kappa(\theta)$ used in equations (1) and (2) has a dimension of n, and its elements are $k(\theta, \theta_1)$, $k(\theta, \theta_2)$, . . . , $k(\theta, \theta_n)$ as seen in equation (3). As will be described later, $k(\theta, \theta_j)$ indicates the closeness between two hyperparameter values $\theta$ and $\theta_j$. Matrix K used in equations (1) and (2) has a dimension of n rows by n columns, and $k(\theta_i, \theta_j)$ represents the element at the ith row and jth column, as seen in equation (4). As will be described later, $k(\theta_i, \theta_j)$ indicates the closeness between two hyperparameter values $\theta_i$ and $\theta_j$.

$$\kappa(\theta) = (k(\theta, \theta_1), k(\theta, \theta_2), \ldots, k(\theta, \theta_n))^T \qquad (3)$$

$$K = \begin{pmatrix} k(\theta_1, \theta_1) & \cdots & k(\theta_1, \theta_n) \\ \vdots & \ddots & \vdots \\ k(\theta_n, \theta_1) & \cdots & k(\theta_n, \theta_n) \end{pmatrix} \qquad (4)$$

Column vector $\mu(s)$ used in equation (1) has a dimension of n, and its elements are $\mu(\theta_1, s), \mu(\theta_2, s), \ldots, \mu(\theta_n, s)$, as seen in equation (5). That is, column vector $\mu(s)$ is a collection of mean values of prediction performance, corresponding to the n hyperparameter values. Column vector $\sigma^2(s)$ used in equation (2) has a dimension of n, and its elements are $\sigma^2(\theta_1, s), \sigma^2(\theta_2, s), \ldots, \sigma^2(\theta_n, s)$ as seen in equation (6). That is, column vector $\sigma^2(s)$ is a collection of variance values of prediction performance, corresponding to the n hyperparameter values. Row vector $h^2(\theta)$ used in equation (2) is formed from squared elements of $\kappa(\theta)^T K^{-1}$.

$$\mu(s) = (\mu(\theta_1, s), \mu(\theta_2, s), \ldots, \mu(\theta_n, s))^T \qquad (5)$$

$$\sigma^2(s) = (\sigma^2(\theta_1, s), \sigma^2(\theta_2, s), \ldots, \sigma^2(\theta_n, s))^T \qquad (6)$$

Function $k(\cdot, \cdot)$ used in equations (2), (3), and (4) is a kernel function for use in Gaussian processes. For example, equation (7) or equation (8) may be used as the kernel function. Coefficient b in equation (7) and coefficient $b_d$ in equation (8) may be specified by the user, or may be optimized by the machine learning apparatus 100. Equation (8) assumes that hyperparameter values $\theta$ are given in a D-dimensional vector. Symbol $\theta_d$ in equation (8) represents the d-th hyperparameter value.

$$k(\theta, \theta^*) = \exp(-(\theta - \theta^*)^2 / b) \quad (7)$$

$$k(\theta, \theta^*) = b_0\left(1 + \sqrt{5r^2(\theta, \theta^*)} + \frac{5}{3}r^2(\theta, \theta^*)\right)\exp\left(-\sqrt{5r^2(\theta, \theta^*)}\right) \quad (8)$$

$$\text{where } r^2(\theta, \theta^*) = \frac{\sum_{d=1}^{D}(\theta_d - \theta_d^*)^2}{b_d^2}$$

The above equations permit direct calculation of mean $\mu$ and standard deviation $\sigma$ of prediction performance. It is noted here that the above estimates of prediction performance corresponding to n hyperparameter values are treated with equal weights. As an alternative, some estimates with small standard deviations may be given a higher weight, while other estimates with larger standard deviations may be given a lower weight. This is equivalent to estimating the mean $\mu$ and standard deviation $\sigma$ of prediction performance by using a Gaussian process that takes input-dependent noise into consideration.

Figure 20:
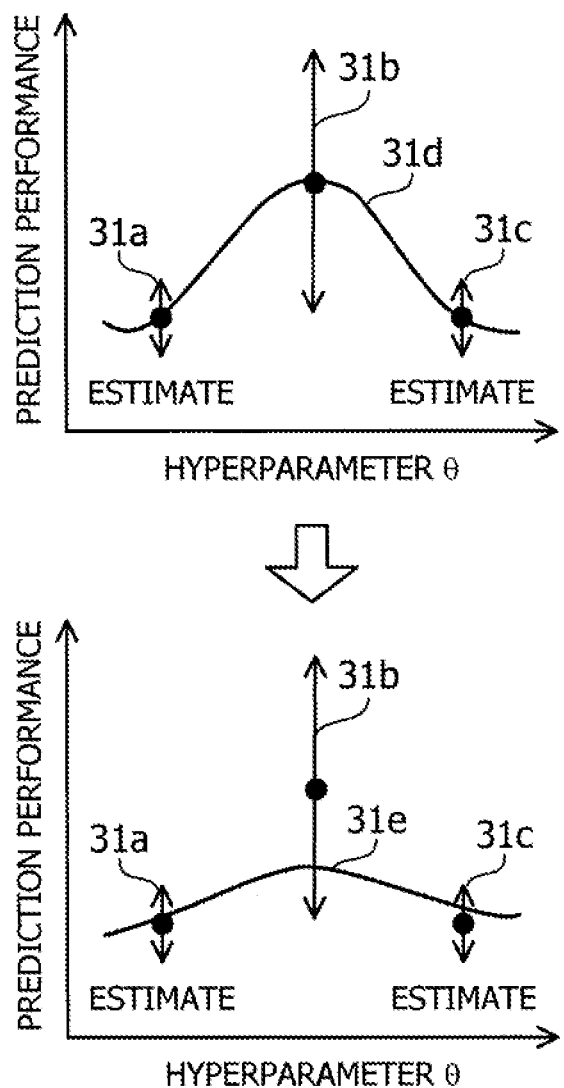
FIG. 20 illustrates a second exemplary estimation of a standard deviation of prediction performance.

FIG. 20 illustrates a second exemplary estimation of a standard deviation of prediction performance. The graphs seen in FIG. 20 include first to third estimates 31a to 31c. The first estimate 31a represents prediction performance at a first hyperparameter value in combination with a specific sample size, which is estimated from measurement values with respect to small sample sizes. The second estimate 31b represents prediction performance at a second hyperparameter value in combination with a specific sample size, which is estimated from measurement values with respect to small sample sizes. The third estimate 31c represents prediction performance at a third hyperparameter value in combination with a specific sample size, which is estimated from measurement values with respect to small sample sizes.

The first and third estimates 31a and 31c have a relatively small standard deviation, whereas the second estimate 31b has a larger standard deviation. If these estimates 31a, 31b, and 31c are treated as equals, a curve 31d will be drawn as seen in the upper half of FIG. 20 to indicate how the prediction performance changes as the hyperparameter $\theta$ increases. If the estimates 31a, 31b, and 31c are weighted according to their respective standard deviations, a different curve 31e will be drawn as seen in the lower half of FIG. 20. The latter curve 31e is more moderate and natural, which suggests a possible improvement in estimation accuracy.

The following description explains other equations used to calculate mean $\mu$ and standard deviation $\sigma$ of prediction performance.

When a hyperparameter value $\theta$ and a sample size s are given, equation (9) calculates the mean $\mu(\theta, s)$ of prediction performance by using column vector $\kappa(\theta)$, matrix K, matrix $K_N$, and column vector $\mu(s)$. Equation (10), on the other hand, calculates the variance $\sigma^2(\theta, s)$ of prediction performance by using kernel function $k(\cdot, \cdot)$, $r(\theta)$, column vector $\kappa(\theta)$, matrix K, and matrix $K_N$.

$$\mu(\theta,s) = \kappa(\theta)^T(K+K_N)^{-1}\mu(s) \quad (9)$$

$$\sigma^2(\theta,s) = k(\theta,\theta) + r(\theta) - \kappa(\theta)^T(K+K_N)^{-1}\kappa(\theta) \quad (10)$$

Matrix $K_N$ used in equations (9) and (10) is a square matrix of n rows by n columns, in which the elements of column vector $\sigma^2(s)$ are placed diagonally as seen in equation (11). Non-diagonal elements of $K_N$ are all zeros. Term $r(\theta)$ used in equation (10) is calculated by using column vector $\kappa_z(\theta)$, matrix $K_z$, and column vector z, as seen in equation (12).

$$K_N = \text{diag}(\sigma^2(s)) \quad (11)$$

$$r(\theta) = \exp(\mu_z(\theta, s)) \quad (12)$$
$$= \exp(\kappa_z(\theta)^T, K_z^{-1}z)$$

Column vector $\kappa_z(\theta)$ is calculated similarly to $\kappa(\theta)$, but using a different kernel function. Matrix $K_z$ is calculated similarly to K, but using a different kernel function. The kernel functions used in column vector $\kappa_z(\theta)$ and matrix $K_z$ may have a different form from $k(\cdot, \cdot)$. Alternatively, the kernel functions used in $\kappa_z(\theta)$ and $K_z$ may have the same form as $k(\cdot, \cdot)$, but different coefficients. Column vector z is formed from a logarithmic version of the elements of $\sigma^2(s)$.

The third embodiment provides the same advantages as the second embodiment. In addition, the third embodiment does not rely upon Monte Carlo simulation. Rather, the third embodiment directly calculates means and standard deviations of prediction performance with respect to unexecuted hyperparameters. The computational load of performance estimation is reduced accordingly.

(d) Fourth Embodiment

This section of the description is directed to a fourth embodiment. The second and fourth embodiment share some common elements (for which see the preceding part of the description). The following description will focus on the distinctive points of the fourth embodiment.

The fourth embodiment is different from the second embodiment in its method of selecting a combination of a hyperparameter value and a sample size for the next execution of machine learning. The fourth embodiment is implemented in a machine learning apparatus with the same hardware configuration discussed in FIG. 2. Functions of this machine learning apparatus are implemented as like software modules discussed in FIG. 11. The following description will now explain a machine learning apparatus of the fourth embodiment, using the same reference numerals for like elements as used in FIGS. 2 and 11.

Figure 21:
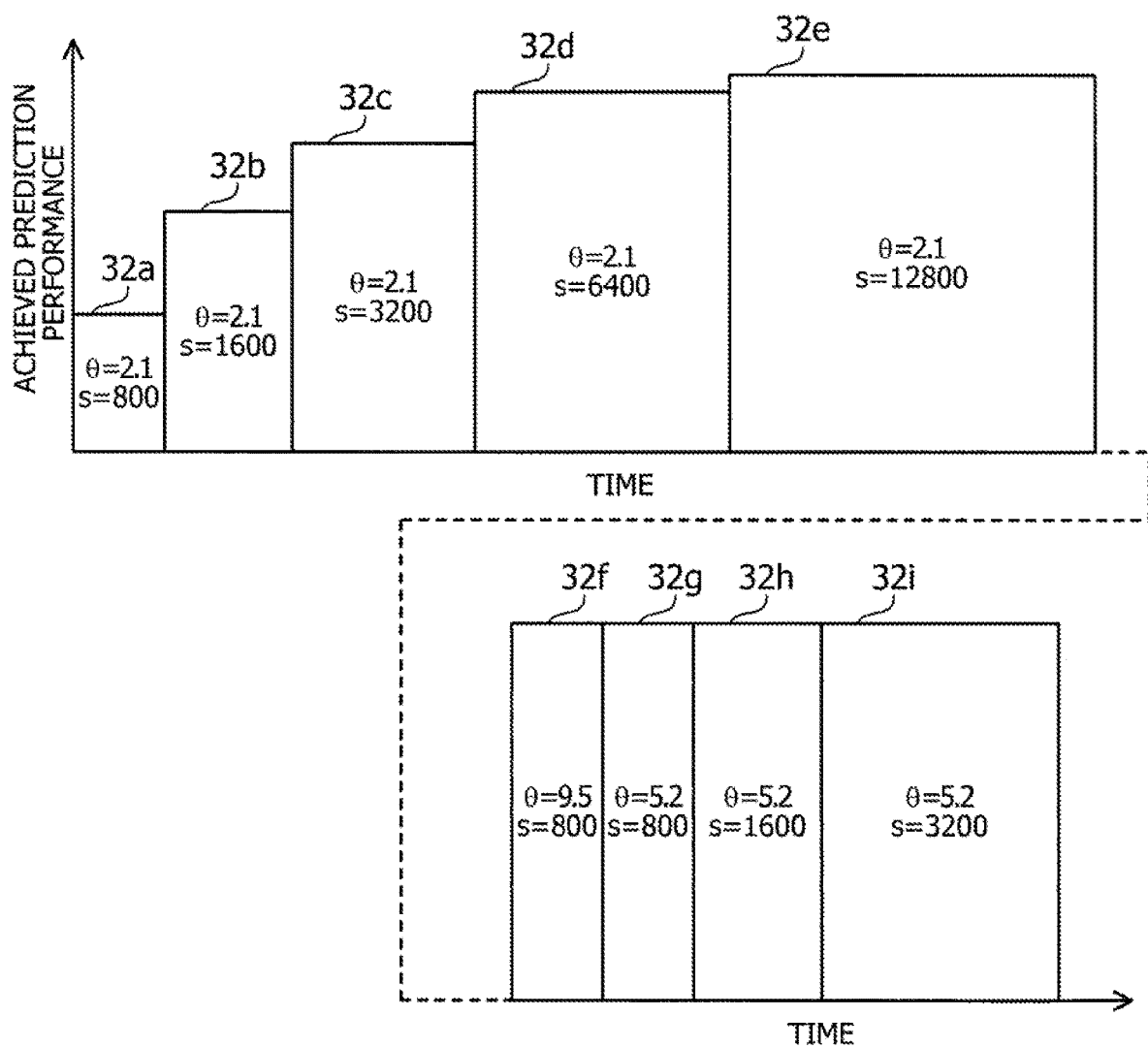
FIG. 21 illustrates a second example of how the prediction performance varies during the course of a progressive sampling method.

FIG. 21 illustrates a second example of how the prediction performance varies during the course of a progressive sampling method. According to the fourth embodiment, the machine learning apparatus 100 is designed to execute a series of learning steps with a consistent hyperparameter value that is selected, until the improvement speed falls below a certain threshold R.

Referring to the example of FIG. 21, the machine learning apparatus 100 first executes a learning step 32a with a setup of $\theta=2.1$ and s=100 to 800. When this learning step 32a is finished, the machine learning apparatus 100 re-evaluates the improvement speed of $\theta=2.1$ to ensure that it is greater than or equal to threshold R. The machine learning apparatus 100 moves to the next larger sample size, s=1600, while continuing the current selection of $\theta=2.1$.

The machine learning apparatus 100 then executes another learning step 32b, now with a setup of $\theta=2.1$ and s=1600. When this learning step 32b is finished, the machine learning apparatus 100 re-evaluates the improvement speed of $\theta=2.1$ to ensure that it is greater than or equal to threshold R. The machine learning apparatus 100 moves to the next larger sample size, s=3200, while continuing the current selection of θ=2.1.

The machine learning apparatus 100 executes yet another learning step 32c, now with a setup of θ=2.1 and s=3200. Likewise, the machine learning apparatus 100 executes a learning step 32d with a setup of θ=2.1 and s=6400, and then a learning step 32e with a setup of θ=2.1 and s=12800. When the learning step 32e is finished, the machine learning apparatus 100 re-evaluates the improvement speed of θ=2.1 and finds it below the threshold R this time. The machine learning apparatus 100 thus determines to end the machine learning with θ=2.1.

Subsequently the machine learning apparatus 100 executes a learning step 32f, where a new hyperparameter value θ=9.5 is selected in combination with s=100 to 800. When this learning step 32f is finished, the machine learning apparatus 100 re-evaluates the improvement speed of θ=9.5 and finds it still below the threshold R. The machine learning apparatus 100 thus determines to end the machine learning with θ=9.5.

Subsequently the machine learning apparatus 100 executes a learning step 32g, where a new hyperparameter value θ=5.2 is selected in combination with s=100 to 800. When this learning step 32g is finished, the machine learning apparatus 100 re-evaluates the improvement speed of θ=5.2 to ensure that it is greater than or equal to threshold R. The machine learning apparatus 100 moves to the next larger sample size, s=1600, while continuing the current selection of θ=5.2.

Subsequently the machine learning apparatus 100 executes a learning step 32h with a setup of θ=5.2 and s=1600. Likewise, the machine learning apparatus 100 executes a learning step 32i with a setup of θ=5.2 and s=3200. When this learning step 32i is finished, the machine learning apparatus 100 re-evaluates the improvement speed of θ=5.2 and finds it below the threshold R. The machine learning apparatus 100 thus determines to end the machine learning with θ=5.2.

FIG. 22 illustrates a second exemplary progress screen of machine learning. The machine learning apparatus 100 is configured to display a learning progress screen 33 on the monitor 111 during the course of machine learning. The learning progress screen 33 indicates the execution order of learning steps. Specifically, the learning progress screen 33 presents a table formed from rows representing hyperparameter values and columns representing sample sizes. As the machine learning process moves on, the machine learning apparatus 100 adds a numerical value to the table in the learning progress screen 33 so as to indicate which learning step is being executed.

For example, order number "1" appears on the learning progress screen 33 when a learning step with θ=2.1 and s≤800 begins. Similarly, order number "2" appears on the learning progress screen 33 when a learning step with θ=2.1 and s=1600 begins. Order number "3" appears when a learning step with θ=2.1 and s=3200 begins. Order number "4" appears when a learning step with θ=2.1 and s=6400 begins. Order number "5" appears when a learning step with θ=2.1 and s=12800 begins. Order number "6" appears when a learning step with θ=9.5 and s≤800 begins. Order number "7" appears when a learning step with θ=5.2 and s≤800 begins. Order number "8" appears when a learning step with θ=5.2 and s=1600 begins. Order number "9" appears when a learning step with θ=5.2 and s=3200 begins.

Figure 23:
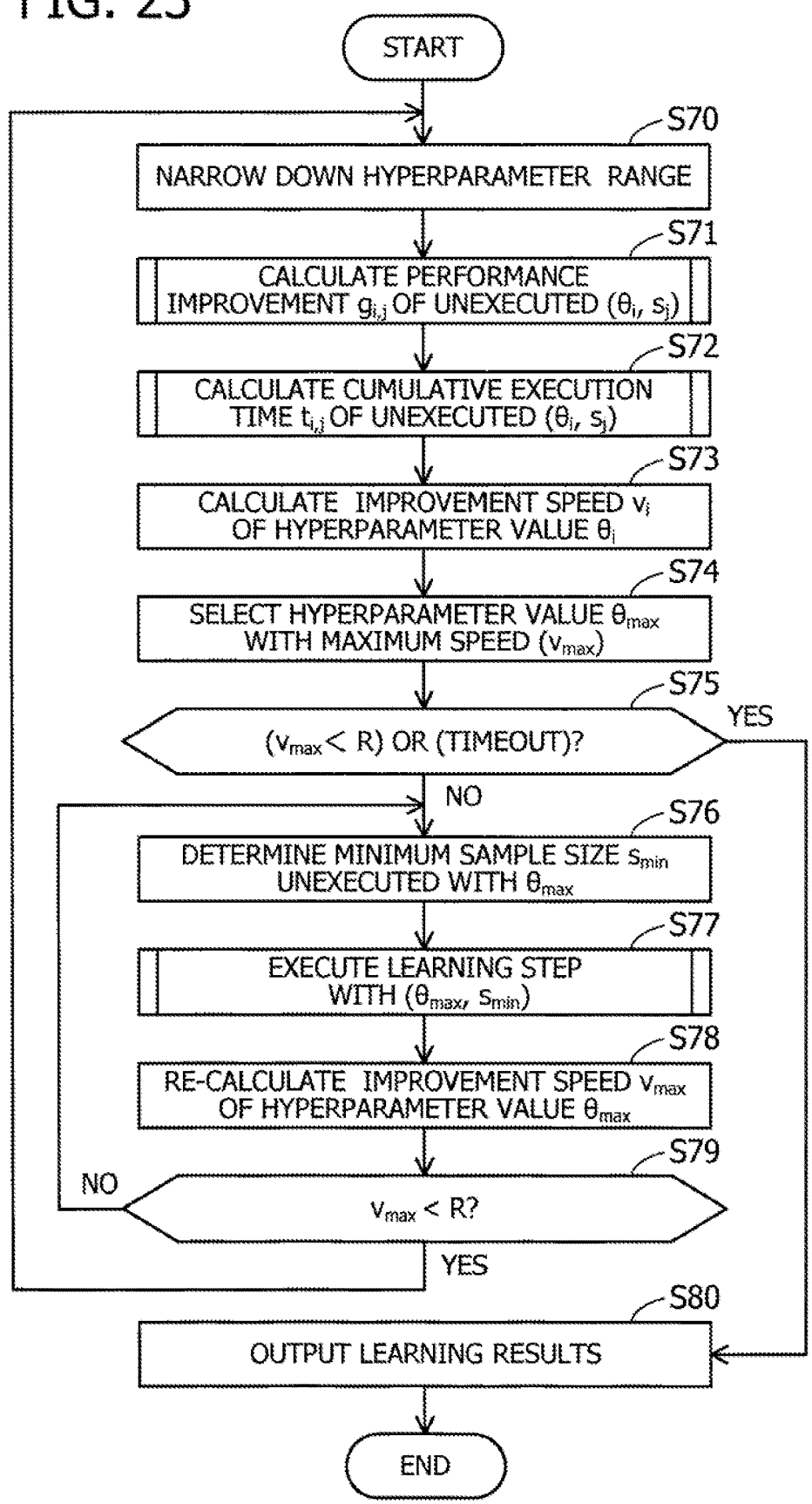
FIG. 23 is a flowchart that illustrates a second exemplary procedure of machine learning.

FIG. 23 is a flowchart that illustrates a second exemplary procedure of machine learning.

(S70) The learning control unit 128 extracts a subset of hyperparameter values from a given space of hyperparameter values that are applicable to the machine learning algorithm in use. In this step, the learning control unit 128 randomly picks up a certain number (e.g., 30) of unexecuted hyperparameter values, thus enrolling them as members of the noted subset. In the fourth embodiment, however, the subset of hyperparameter values may exclude executed ones.

(S71) The performance improvement estimation unit 127 calculates a performance improvement $g_{i,j}$ with respect to each unexecuted combination $(\theta_i, s_j)$ of a hyperparameter value and a sample size, where the hyperparameter $\theta_i$ belonging to the subset extracted in step S70.

(S72) The time estimation unit 126 calculates a cumulative execution time $t_{i,j}$ with respect to each unexecuted combination $(\theta_i, s_j)$ of a hyperparameter value and a sample size, where the hyperparameter $\theta_i$ belonging to the subset extracted in step S70.

(S73) Based on the performance improvement $g_{i,j}$ calculated in step S71 and the cumulative execution time $t_{i,j}$ calculated in step S72, the learning control unit 128 calculates an improvement speed $v_i$ with respect to each hyperparameter in the subset extracted in step S70.

(S74) Out of the subset extracted in step S70, the learning control unit 128 selects a hyperparameter value that exhibits the highest improvement speed in step S73.

(S75) The learning control unit 128 determines whether the improvement speed $v_{max}$ obtained in step S74 is smaller than a threshold R. The learning control unit 128 also keeps track of the time elapsed since the start of the first learning step and determines whether the machine learning process has exceeded its time limit. When either condition is met, the process skips to step S80. When neither of the two conditions is met, the process advances to step S76.

(S76) The learning control unit 128 determines the smallest sample size that has not yet been executed in combination with the largest hyperparameter value $\theta_{max}$ selected in step S74.

(S77) The step execution unit 125 executes a learning step with the selected hyperparameter value $\theta_{max}$ and the determined sample size $s_{min}$.

(S78) The performance improvement estimation unit 127 re-calculates a performance improvement $g_{max,j}$ of unexecuted sample sizes $s_1$ in combination with the hyperparameter value $\theta_{max}$ The time estimation unit 126 also re-calculates a cumulative execution time $t_{max,j}$ of unexecuted sample size $s_j$ in combination with the hyperparameter value $\theta_{max}$. Then, based on the new performance improvement $g_{max,j}$ and cumulative execution time $t_{max,j}$, the learning control unit 128 re-calculates an improvement speed $v_{max}$ of the hyperparameter value $\theta_{max}$.

(S79) The learning control unit 128 determines whether the improvement speed $v_{max}$ updated in step S78 is smaller than the threshold R. If $v_{max}$ is smaller than R, the process returns to step S70. If $v_{max}$ is greater than or equal to R, the process returns to step S76.

(S80) The learning control unit 128 terminates the present machine learning process after storing final results into the learning result storage unit 123. More specifically, the final results include a model with the highest prediction performance of all the models produced. Also included are the information about the model's prediction performance, the hyperparameter value used in the machine learning of the model, and the sample size used in the same.

The fourth embodiment provides the same advantages as the second embodiment. In addition, the fourth embodiment is positive in using large sample sizes together with one hyperparameter value, so that the achieved prediction performance tends to rise in an earlier stage. This makes it less likely to execute learning steps with a small sample size in combination with many hyperparameter values. In other words, the fourth embodiment reduces worthless learning steps that ultimately do not contribute to performance improvement of models.

(e) Fifth Embodiment

This section of the description is directed to a fifth embodiment. The second and fifth embodiment share some common elements (for which see the preceding part of the description). The following description will focus on the distinctive points of the fifth embodiment.

The fifth embodiment is different from the second embodiment in its method of estimating prediction performance from measurement values obtained with smaller sample sizes. The fifth embodiment is implemented in a machine learning apparatus with the same hardware configuration discussed in FIG. 2. Functions of this machine learning apparatus are implemented as like software modules discussed in FIG. 11. The following description will now explain a machine learning apparatus of the fifth embodiment, using the same reference numerals for like elements as used in FIGS. 2 and 11.

FIG. 24 is a graph that illustrates relationships among upper limit, estimates, and standard errors of prediction performance. Measurement values obtained with respect to a certain sample size have a risk of deviating from theoretical values that are determined from hyperparameter values and the characteristics of the data population. That is, measurement values of prediction performance may vary even if the same data population is used, because the selection of training data and test data depends upon contingency. The smaller the sample size, the larger the variance of measurement values.

In FIG. 24, fifty learning steps are executed with each different sample size, without changing the hyperparameter value or the data population. Referring to the sample size of 100 in FIG. 24, the measurement values are distributed across a wide range of prediction performance, about 0.58 to 0.68. Referring to the sample size of 400, the range of measurement values is reduced to about 0.69 to 0.75. The range of measurement values becomes smaller and smaller as the sample size grows. With a sufficiently large sample size, the measurement values converge into about 0.76.

For the purpose of estimating prediction performance, the machine learning apparatus 100 generates a prediction performance curve with respect to an executed hyperparameter value, using measurement values obtained with small sample sizes. However, small sample sizes could lead to large deviation of measurement values from the theoretical value of prediction performance, which leaves a doubt on the accuracy of the prediction performance curve. Accordingly, the fifth embodiment is configured to calculate a prediction performance curve, taking advantage of the characteristics described below.

FIG. 24 illustrates a curve 34a that indicates estimated values of prediction performance, which is determined from the characteristics of hyperparameter values and data population. In other words, this curve 34a is an ideal prediction performance curve. The curve 34a has an upper limit 34b in which the prediction performance is saturated. Suppose now that the curve 34a gives a specific estimate 34c at a certain sample size. The measurement values of prediction performance at that sample size include a standard error that is supposed, in many of the cases, to be proportional to the difference between the upper limit 34b and the estimate 34c. The standard error of measurement values equals to the standard deviation of differences (residuals) between the estimate 34c and measurement values. The noted nature holds true to any sample size.

A large standard error occurs to measurement values when sample size is small. When sample size is small, the difference between the estimate (theoretical value) and upper limit 34b of prediction performance becomes large. Reversely stated, a small standard error occurs to measurement values when sample size is large. When sample size is large, the difference between the estimate and upper limit 34b of prediction performance becomes small. In many of the cases, and in the whole range of sample size, the standard error in measurement values of prediction performance is proportional to the difference between the estimate and upper limit 34b of prediction performance.

The machine learning apparatus 100 takes advantage of the above nature when calculating a curve 34a from measurement values of prediction performance. More specifically, the machine learning apparatus 100 assumes the following estimation formula for a prediction performance curve: $\mu = c - \exp(a \times f(s) + b)$. Explanatory variable s represents sample size, and response variable $\mu$ represents prediction performance. Three unknown coefficients a, b, and c are determined through a regression analysis. Coefficient c is the upper limit of prediction performance. Function f(s) includes sample size s as the argument, but does not include any unknown coefficient. The following example assumes $f(s) = \log(s)$.

The above estimation formula is rewritten into the following form: $\log(c - \mu) = a \times \log(s) + b$. In view of this, the machine learning apparatus 100 transforms the above-noted explanatory variable and response variable to $x = \log(s)$ and $y = \log(c - \mu)$, respectively. The above prediction formula is then expressed as $y = a \times x + b$. The machine learning apparatus 100 thus performs a linear regression analysis on (x, y), instead of a non-linear regression analysis on (s, $\mu$).

The regression model of (x, y) is linear whereas the regression model of (s, $\mu$) is non-linear. In addition, homoscedasticity (or homogeneity of variance) can be assumed as to the variables x and y. That is, the standard error of $y = \log(c - \mu)$ is nearly constant against any $x = \log(s)$ because the standard error of prediction performance is proportional to the difference between estimate and upper limit, as mentioned above. Since both the linearity and homoscedasticity hold, it is more likely that the regression analysis on the converted model yields a proper prediction performance curve.

It is noted, however, that the transformed response variable $y = \log(c - \mu)$ contains an unknown coefficient c, and the value of c is supposed to be determined by regression analysis. Accordingly, the machine learning apparatus 100 is configured to seek an appropriate value of coefficient c on a trial-and-error basis. That is, the machine learning apparatus 100 first seeks the values of coefficients a and b by executing a linear regression analysis with an appropriate initial assumption of coefficient c. The machine learning apparatus 100 then evaluates the prediction performance curve given by the three coefficients a, b, and c, then changes the value of c, and executes another round of linear regression analysis. The machine learning apparatus 100 repeats these operations until a prediction performance curve with a sufficiently high evaluation score is obtained.

FIG. 25 is a flowchart that illustrates an exemplary procedure of generating estimation formulas.

(S90) The performance improvement estimation unit 127 obtains a set of measurement data (s, μ) with respect to a specific hyperparameter value $\theta_i$. This measurement data represents the cumulative results of learning steps that have been executed with $\theta_i$.

(S91) The performance improvement estimation unit 127 determines a coefficient set {a, b, c}.

(S92) The performance improvement estimation unit 127 identifies the largest measurement value Max(μ) among those in the measurement data obtained above. The performance improvement estimation unit 127 then initializes coefficient c by assigning the sum of Max(μ) and a predetermined value (e.g., $10^{-8}$).

(S93) Using the current value of coefficient c, the performance improvement estimation unit 127 converts the measurement data set (s, μ) to transformed data set (x, y). Specifically, the performance improvement estimation unit 127 performs a logarithmic conversion of (s, μ) according to x=log(s) and y=log(c−μ).

(S94) The performance improvement estimation unit 127 subjects the transformed data set (x, y) to a linear regression analysis, thereby calculating coefficients a and b in y=a×x+b. For example, the performance improvement estimation unit 127 uses a least-squares approximation to obtain the values of a and b that minimize the sum of squared residuals.

(S95) With the obtained values of coefficients a, b, and c, the performance improvement estimation unit 127 calculates an estimated value of $\mu_0$=c−exp(a×log(s)+b), with respect to each record in the measurement data set (s, μ).

(S96) The performance improvement estimation unit 127 calculates a weighted sum of squared residuals from the measurement values μ and estimated values $\mu_0$ of prediction performance. This weighted sum serves as an evaluation score G for the coefficients a, b, and c. More specifically, the performance improvement estimation unit 127 calculates G=sum{$(\mu_0-\mu)^2$×w}. Here the weight w may be common to all measurement values μ. Alternatively, different weights w may be given to individual measurement values μ. For example, the weight w may exactly be the sample size s, or may be a value that depends on the sample size s.

(S97) The performance improvement estimation unit 127 determines whether the coefficient c has been optimized. For example, the optimization in the present context is completed when the evaluation score G falls below a threshold or when the evaluation score G appears to be saturated. Another example of completed optimization is when the repetition count of steps S93 to S96 reaches a certain threshold, or when a specific time is passed since the optimization is started. Upon completion of optimization, this process of estimation formula generation is terminated. Otherwise, the process proceeds to step S98.

(S98) The performance improvement estimation unit 127 changes the value of coefficient c. For example, the performance improvement estimation unit 127 may randomly selects a new value for coefficient c. Another example is to shift the value of coefficient c by a predetermined amount. Yet another example is to estimate, from the past evaluation scores G, a new value of coefficient c that is expected to yield a better evaluation score G. The process then goes back to step S93.

The fifth embodiment provides the same advantages as the second embodiment. In addition, the fifth embodiment improves the credibility of estimation formulas used to estimate prediction performance on the basis of sample size. That is, the improved formulas of the fifth embodiment permit accurate estimation of prediction performance with respect to a large sample size from a limited number of measurement values obtained with small sample sizes.

The description has covered first to fifth embodiments. It is noted that the proposed features of these embodiments may be combined in various ways.

As previously discussed, the information processing operations according to the first embodiment are implemented by running software programs on a machine learning management apparatus 10. Similarly, the information processing operations according to the second to fifth embodiments are implemented by running software programs on a machine learning apparatus 100.

The programs may be recorded on a non-transitory computer-readable medium (e.g., storage medium 113). Suitable storage media include, for example, magnetic disk media, optical disc media, magneto-optical disc media, and semiconductor memory devices. Magnetic disk media include FD and HDD. Optical disc media include CD, CD-Recordable (CD-R), CD-Rewritable (CD-RW), DVD, DVD-R, and DVD-RW. Programs may be distributed in the form of a portable storage medium. A computer may install these programs from a portable storage medium to some other storage medium (e.g., HDD 103) and execute the copy of the programs.

Various embodiments have been described above. In one aspect, the proposed techniques provide an efficient way of seeking and determining appropriate parameter values for machine learning.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable medium storing a program that causes a computer to perform a procedure comprising:

obtaining a first measurement value representing prediction performance of a model that has been learned by using a first parameter value and training data of first size, the first parameter value being among a set of parameter values applicable to a machine learning algorithm;

estimating, based on the first measurement value, a first expected value and a first variance degree of prediction performance of a model that would be learned by using the first parameter value and training data of second size;

obtaining a second measurement value representing prediction performance of a model that has been learned by using a second parameter value and training data of the first size, the second parameter value being among the set of parameter values;

estimating, based on the second measurement value, a second expected value and a second variance degree of prediction performance of a model that would be learned by using the second parameter value and training data of the second size;

estimating, based on the estimated first and second expected values and the estimated first and second variance degrees, a third expected value and a third variance degree of prediction performance of a model that would be learned by using a third parameter value and training data of the second size, the third parameter value being among the set of parameter values; and executing machine learning with a selected parameter value among the set of parameter values, the selected parameter value being selected based on the third expected value and the third variance degree.

2. The non-transitory computer-readable storage medium according to claim 1, wherein the third variance degree is greater than a variance degree that is obtained through a regression analysis using the estimated first and second expected values, but using neither the estimated first variance degree nor the estimated second variance degree.

3. The non-transitory computer-readable storage medium according to claim 1, wherein the estimating of the third variance degree includes:

extracting first sample values of prediction performance, based on the estimated first expected value and the estimated first variance degree;

extracting second sample values of prediction performance, based on the estimated second expected value and the estimated second variance degree; and estimating the third variance degree by using the first sample values and the second sample values.

4. The non-transitory computer-readable storage medium according to claim 1, wherein the estimating of the third variance degree includes:

calculating a first variance component indicating a variation of the third expected value that is caused by variations of the estimated first expected value and the estimated second expected value;

calculating a second variance component indicating statistical error that is caused by estimating the third expected value from the estimated first expected value and the estimated second expected value; and estimating the third variance degree by consolidating the first variance component and the second variance component.

5. The non-transitory computer-readable storage medium according to claim 1, wherein the procedure further comprises:

calculating a reference value of prediction performance greater than the third expected value, based on the third expected value and the third variance degree; and determining, based on the reference value, whether to execute machine learning using the third parameter value and training data of the second size.

6. A method for managing a machine learning process, comprising:

obtaining, by a processor, a first measurement value representing prediction performance of a model that has been learned by using a first parameter value and training data of first size, the first parameter value being among a set of parameter values applicable to a machine learning algorithm;

estimating, by the processor and based on the first measurement value, a first expected value and a first variance degree of prediction performance of a model that would be learned by using the first parameter value and training data of second size;

obtaining, by the processor, a second measurement value representing prediction performance of a model that has been learned by using a second parameter value and training data of the first size, the second parameter value being among the set of parameter values;

estimating, by the processor and based on the second measurement value, a second expected value and a second variance degree of prediction performance of a model that would be learned by using the second parameter value and training data of the second size;

estimating, by the processor and based on the estimated first and second expected values and the estimated first and second variance degrees, a third expected value and a third variance degree of prediction performance of a model that would be learned by using a third parameter value and training data of the second size, the third parameter value being among the set of parameter values; and executing machine learning with a selected parameter value among the set of parameter values, the selected parameter value being selected based on the third expected value and the third variance degree.

7. An apparatus that manages a machine learning process, the apparatus comprising:

a memory configured to store therein a first measurement value and a second measurement value, the first measurement value representing prediction performance of a model that has been learned by using a first parameter value and training data of first size, the first parameter value being among a set of parameter values applicable to a machine learning algorithm, the second measurement value representing prediction performance of a model that has been learned by using a second parameter value and training data of the first size, the second parameter value being among the set of parameter values; and a processor, coupled to the memory, configured to perform a procedure including:

estimating, based on the first measurement value, a first expected value and a first variance degree of prediction performance of a model that would be learned by using the first parameter value and training data of second size;

estimating, based on the second measurement value, a second expected value and a second variance degree of prediction performance of a model that would be learned by using the second parameter value and training data of the second size;

estimating, based on the estimated first and second expected values and the estimated first and second variance degrees, a third expected value and a third variance degree of prediction performance of a model that would be learned by using a third parameter value and training data of the second size, the third parameter value being among the set of parameter values; and executing machine learning with a selected parameter value among the set of parameter values, the selected parameter value being selected based on the third expected value and the third variance degree.

* * * * *